United States Patent
Fadaie et al.

(10) Patent No.: US 12,431,027 B2
(45) Date of Patent: Sep. 30, 2025

(54) BEHAVIOR MANAGEMENT OF MULTIPLE VEHICLES

(71) Applicant: The Boeing Company, Arlington, VA (US)

(72) Inventors: Joshua Gould Fadaie, St. Louis, MO (US); Sean Soleyman, Calabasas, CA (US); Fan Hin Hung, Los Angeles, CA (US); Deepak Khosla, Camarillo, CA (US); Charles Richard Tullock, St. Peters, MO (US)

(73) Assignee: The Boeing Company, Arlington, VA (US)

( * ) Notice: Subject to any disclaimer, the term of this patent is extended or adjusted under 35 U.S.C. 154(b) by 407 days.

(21) Appl. No.: 18/315,229

(22) Filed: May 10, 2023

(65) Prior Publication Data
US 2024/0379013 A1    Nov. 14, 2024

(51) Int. Cl.
*G06N 20/00* (2019.01)
*G08G 5/20* (2025.01)
*G08G 5/30* (2025.01)

(52) U.S. Cl.
CPC .............. *G08G 5/30* (2025.01); *G06N 20/00* (2019.01); *G08G 5/20* (2025.01)

(58) Field of Classification Search
CPC ............. G08G 5/30; G08G 5/20; G06N 20/00
See application file for complete search history.

(56) References Cited

U.S. PATENT DOCUMENTS

| | | |
|---|---|---|
| 11,150,670 B2 | 10/2021 | Khosla et al. |
| 2021/0147079 A1 | 5/2021 | Soleyman et al. |

OTHER PUBLICATIONS

"AlphaStar: Masteringthe real-timestrategy gameStarCraft II," Alphabet Inc., Jan. 24, 2019, accessed May 9, 2023, 13 pages.https://www.deepmind.com/blog/alphastar-mastering-the-real-time-strategy-game-starcraft-ii.

"OpenAIFive," copyright OpenAI, Jun. 25, 2018, accessed May 9, 2023, 14 pages.https://openai.com/research/openai-five.

Piao et al., "Beyond-Visual-Range Air Combat Tactics Auto-Generation by Reinforcement Learning," 2020 International Joint Conference on Neural Networks (IJCNN), Glasgow, UK, Jul. 19-24, 2020, 9 pages.

Pope et al., "Hierarchical Reinforcement Learning for Air-to-Air Combat," 2021 International Conference on Unmanned Aircraft System (ICUAS 21), Jun. 15-18, 2021, Athens, Greece, 10 pages. https://arxiv.org/pdf/2105.00990.pdf.

Schulman et al., "Proximal Policy Optimization Algorithms," arXiv:1707.06347v2, Aug. 28, 2017, 12 pages.https://arxiv.org/pdf/1707.06347.pdf.

Soleyman et al., "Multi-Agent Planning and Autonomy," U.S. Appl. No. 17/167,001, filed Feb. 3, 2021, 45 pages.

*Primary Examiner* — Mathew Franklin Gordon
(74) *Attorney, Agent, or Firm* — Yee & Associates, P.C.

(57) ABSTRACT

A vehicle management system comprising a computer system and an agent. The agent comprises a machine learning model and a rule system. The machine learning model system is trained to receive observations for the vehicle system and select a behavior for the vehicle system in response to receiving the observations. The rule system is configured to select a set of actions to execute the behavior for the vehicle system in response to a selection of the behavior by the machine learning model system.

29 Claims, 13 Drawing Sheets

BEHAVIOR MANAGEMENT OF MULTIPLE VEHICLES

BACKGROUND INFORMATION

1. Field

The present disclosure relates generally to an improved computer system and in particular, to controlling behavior for a set of vehicles using a hierarchical system.

2. Background

With aircraft simulations, groups of aircraft can be modeled using multi-agent based simulations. Each agent represents an aircraft in the environment. With this type of simulation, each agent has its own set of rules and behaviors for controlling an aircraft. The behaviors of the aircraft and the interactions of the aircraft with each other can be modeled in the simulation.

Each aircraft has sensors that enable the agent to observe the state of the aircraft managed by the agent as well as the environment around aircraft. The state information can include the location, orientation, and velocity of an aircraft. The state information can also include the state of fuel, supplies, crew members, and other objects in the aircraft. Further, the state information provided by the sensors can also include the states of other aircraft, weather, and other objects or conditions relating to the environment around the aircraft.

With this information, an agent can perform various operations to control the behavior of the aircraft. For example, the agent can select a trajectory, a speed, and altitude, or other action based on the evaluation of the state of other aircraft in the environment around aircraft controlled by the agent.

SUMMARY

An embodiment of the present disclosure provides an aircraft management system comprising a computer system and an agent. The agent comprises a machine learning model system and a rule system. The machine learning model is configured to receive observations for the aircraft system and select a maneuver behavior for an aircraft system in response to receiving the observation. The rule system is configured to select a set of maneuver actions to execute the maneuver behavior for the aircraft system in response to a selection of the maneuver behavior the by machine learning model system.

Another embodiment of the present disclosure provides an agent management system comprising a computer system; a simulator in the computer system; an agent; an agent environment interface in the computer system; and an agent optimizer in the computer system. The simulator is configured to run a simulation environment; receive actions for the simulation environment; input the actions into the simulation environment; and output observations from the simulation environment. The agent comprises a machine learning model system and a rule system. The machine learning model is configured to receive relevant observations for an aircraft system and select a maneuver behavior for the aircraft system in response to receiving the relevant observations. The rule system is configured to select a set of actions to execute the maneuver behavior for the aircraft system selected by machine learning model. The agent environment interface is configured to send actions selected by the agent to the simulator; receive observations from the simulator in response to the actions sent to the simulator; select the observations for the aircraft system to form the relevant observations; send the relevant observations to the agent; and determine a reward from using the observations from the simulation. The agent optimizer is configured to receive the reward from the agent environment interface in response to the set of actions sent to the simulator; determine a set of weight adjustments based on the reward; send set of weight adjustments to the machine learning model.

Yet another embodiment of the present disclosure provides a vehicle management system comprising a computer system and an agent. The agent comprises a machine learning model and a rule system. The machine learning model system is trained to receive observations for the vehicle system and select a behavior for the vehicle system in response to receiving the observations. The rule system is configured to select a set of actions to execute the behavior for the vehicle system in response to a selection of the behavior by the machine learning model system.

Still another embodiment of the present disclosure provides a method for controlling a vehicle system. A computer system receives observations for the vehicle system. The computer system selects a behavior for the vehicle system using a machine learning model system trained to receive the observations for the vehicle system and select a behavior for the vehicle system in response to receiving the observations. The computer system selects a set of actions to execute the behavior for the vehicle system in response to a selection of the behavior by the machine learning model system. The computer system controls the vehicle system to implement the actions.

Another embodiment of the present disclosure provides a method for controlling an aircraft system. A computer system receives observations for the aircraft system. The computer system selects a maneuver behavior for the aircraft system using a machine learning model in response to receiving the observation. The computer system selects a set of maneuver actions to execute the maneuver behavior for the aircraft system using a rule system in response to a selection. The computer system controls the aircraft system to implement the maneuver actions for the maneuver behavior.

Yet another embodiment of the present disclosure provides a method for training a machine learning model. A computer system receives observations from a simulator running a simulation environment in response to a set of actions input into the simulator. The computer system selects the observations for an aircraft system in the simulation environment to form relevant observations. The computer system sends the relevant observations to an agent that controls the aircraft system. The agent comprises a machine learning model configured to receive the relevant observations for the aircraft system and select a maneuver behavior for the aircraft system in response to receiving relevant observations and a rule system configured to select the set of actions to execute the maneuver behavior for the aircraft system selected by machine learning model. The computer system determines a reward using the relevant observations. The computer system determines a set of weight adjustments based on the reward. The computer system adjusts weights in the machine learning model in the agent using the set of weight adjustments to the Still another embodiment of the present disclosure provides a method for training a machine learning model. A computer system creates an artificial intelligence agent comprising an actor neural network; a critic neural network, and an optimizer. The computer system creates worker agents, wherein a worker agent comprises neural network. The computer system runs the worker with simulations using a set of arguments that are different from a set of arguments for another neural network. The computer system generates gradients to update weights in the worker agents using the results of the simulations. The computer system determines total gradients using the gradients generated for the worker agents. The computer system updates the actor neural network using the total gradients.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. An agent can be implemented using a machine learning model or a rule system. The processing of data about the environment around the aircraft and with a desired speed for real time actions can be more difficult than desired. Aircraft simulations can be complex and the behavior of individual agents for the aircraft can depend on many factors such as the behavior of other agents, weather conditions, other objects, and other factors.

As the number of aircraft increases, a large number of agents can be present in which each agent is expected to behave in a realistic manner. This type of simulation can use large amounts of computing resources such as processor resources and memory. Further, the accuracy and realism of the simulations can be difficult to achieve as the number of aircraft increases within the simulation.

An agent can be implemented using a machine learning model, a genetic algorithm, action masking, rules, or other types of components. These components have not been used in combination to control the behavior of aircraft or other types of vehicles.

Thus, the illustrative examples provide a method, apparatus, system, and computer program product that controls a vehicle system containing one or more vehicles using a hierarchical system. For example, an agent can implement a hierarchical system comprising a machine learning model system and a rule system. The machine learning model system is higher in the hierarchy for controlling behavior as compared to the rule system.

In one illustrative example, a vehicle management system comprises a computer system and an agent. The agent comprises a machine learning model and a rule system. The machine learning model system is trained to receive observations for the vehicle system and select a behavior for the vehicle system in response to receiving the observations. The rule system is configured to select a set of actions to execute the behavior for the vehicle system in response to a selection of the behavior by the machine learning model system.

Figure 1:
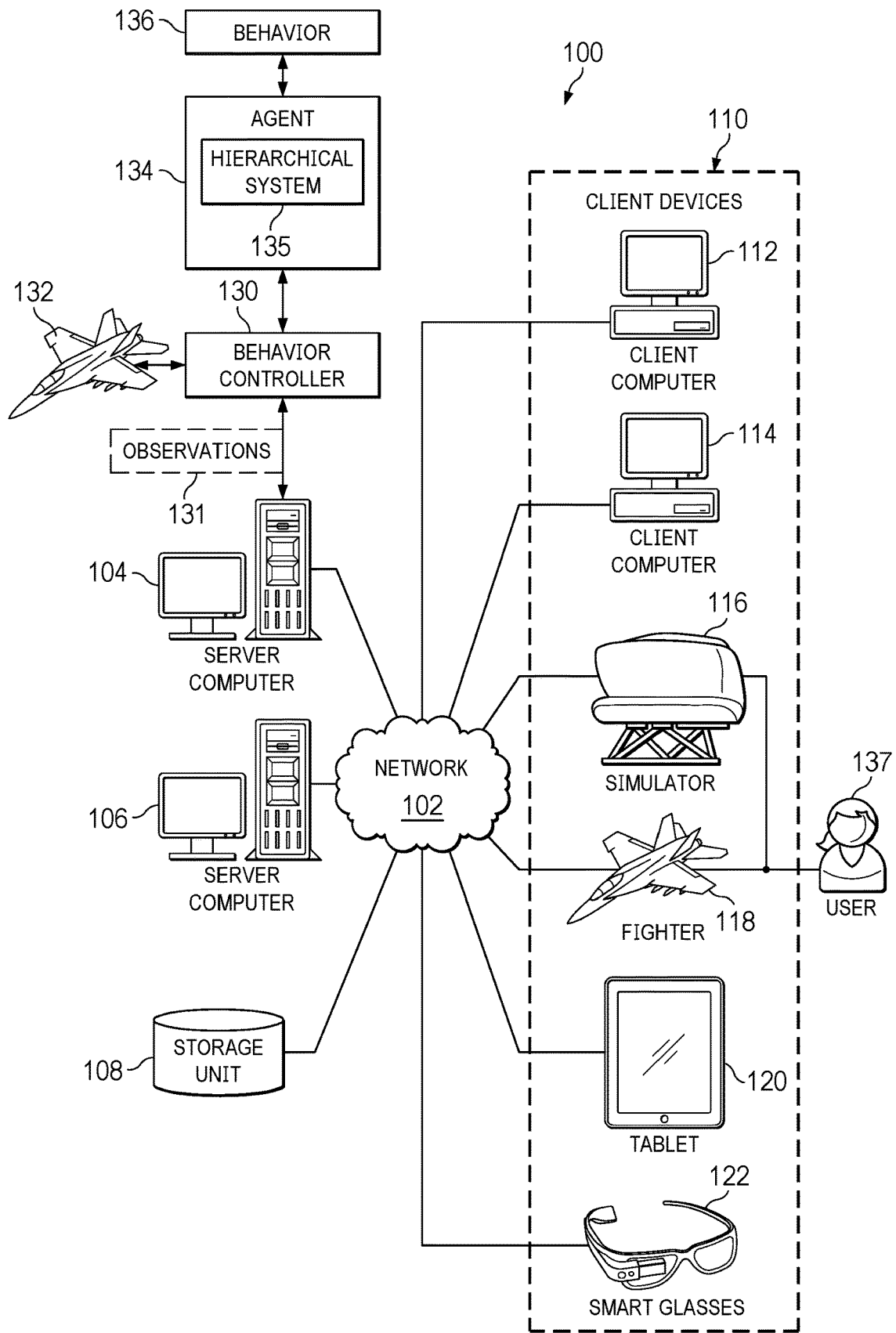
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. Client devices 110 can be, for example, computers, workstations, network computers, vehicles, machinery, appliances, or other devices that can process data. As depicted, client devices 110 include client computer 112, client computer 114, and simulator 116, fighter 118, tablet computer 120, and smart glasses 122. In the depicted example, server computer 104 provides information, such as boot files, operating system images, and applications to client devices 110.

In the depicted example, server computer 104 provides information, such as boot files, operating system images, and applications to client devices 110. Further, in this illustrative example, server computer 104, server computer 106, storage unit 108, and client devices 110 are network devices that connect to network 102 in which network 102 is the communications media for these network devices. Some or all of client devices 110 may form an Internet of Things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols or other networking protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

In this illustrative example, behavior controller 130 can control the behavior of aircraft system 132 using agent 134. In this example, aircraft system 132 can be one or more aircraft. For example, aircraft system 132 can be selected from a group comprising one of a single aircraft, a plurality of aircraft, a plurality of aircraft on a team, and other combinations of aircraft.

When aircraft system 132 is a team of two or more aircraft, behavior controller 130 can use agent 134 to coordinate autonomous behaviors for these aircraft in aircraft system 132. This coordination of aircraft system 132 can be the selection and implementation of maneuvers in which the entire team performs the same maneuver. In other examples, the coordination performed by behavior controller 130 using by agent 134 can be performed on an individual basis. In other words, each aircraft on the team can perform a different maneuver.

In this example, behavior controller 130 receives observations 131. Observations 131 are observations for aircraft system 132. These observations can include, for example, the state of aircraft system 132 and the environment around aircraft system 132. Information about the state of aircraft system 132 can include fuel level, temperature, fuel consumption, location, attitude, and other information about the state of aircraft system 132. Information about the environment around aircraft system 132 can include temperature, pressure, location of other aircraft mission information, and other information.

In this example, behavior 136 can be determined by agent 134. In this example, agent 134 is hierarchical system 135. This hierarchical system can include a machine learning model and a rule system that determines behavior 136 for aircraft system 132 using observations 131. Behavior 136 is for one or more aircraft in aircraft system 132.

Behavior 136 can be comprised of actions that are performed for behavior 136. For example, behavior 136 can be a turn. This turn can occur through the performance of actions to implement the term. These actions can be, for example, direction changes, speed changes, and other actions that are performed to implement to the turn.

In this example, the machine learning model in agent 134 can select maneuver behaviors for behavior 136 for aircraft system 132. The rule system can select maneuver actions to implement the maneuver behavior selected by the machine learning model. Further, the rule system can also select other actions that are non-maneuver actions. An action can also be considered a behavior.

With the identification of behavior 136 by agent 134, behavior controller 130 can control the operation of aircraft system 132. This control of aircraft system 132 can be part of a training exercise. With this example, aircraft system 132 is a team of aircraft and an adversarial team is also present that can be controlled by human operators in the training exercise.

In some illustrative examples, behavior 136 can be sent over network 102 to simulator 116 in which simulator 116 displays behavior 136 performed by aircraft system 132 to user 137 operating simulator 116 as part of a training exercise. With the display of behavior 136 for aircraft system 132, user 137 can perform actions in the training exercise in response to visualizing and receiving information for behavior 136 for aircraft system 132.

In another example, user 137 can operate fighter 118. With this example, behavior 136 can be sent to fighter 118 over network 102 for display to user 137. In this example, fighter 118 can display behavior 136 for aircraft system 132 on a heads-up display, a display system, or instrumentation panel in fighter 118. With the display of behavior 136 for aircraft system 132, user 137 can operate fighter 118 to perform different actions as part of a training exercise using fighter 118.

In yet other illustrative examples, behavior 136 can be sent to other client devices in client devices 110. Behavior 136 can be displayed on the client devices to other users who may participate in the training exercise or may analyze behavior 136 of aircraft system 132. For example, behavior 136 can also be sent to client computer 112, client computer 114, tablet computer 120, or smart glasses 122. These different client devices can display behavior 136.

In other illustrative examples, one or more of client devices 110 can analyze behavior 136 to perform other actions. For example, these client devices can also include agents that predict behavior for aircraft, ships, or other types of vehicles using behavior 136. In these examples, this behavior can be treated as observations for vehicles for which the client devices estimate behaviors.

Figure 2:
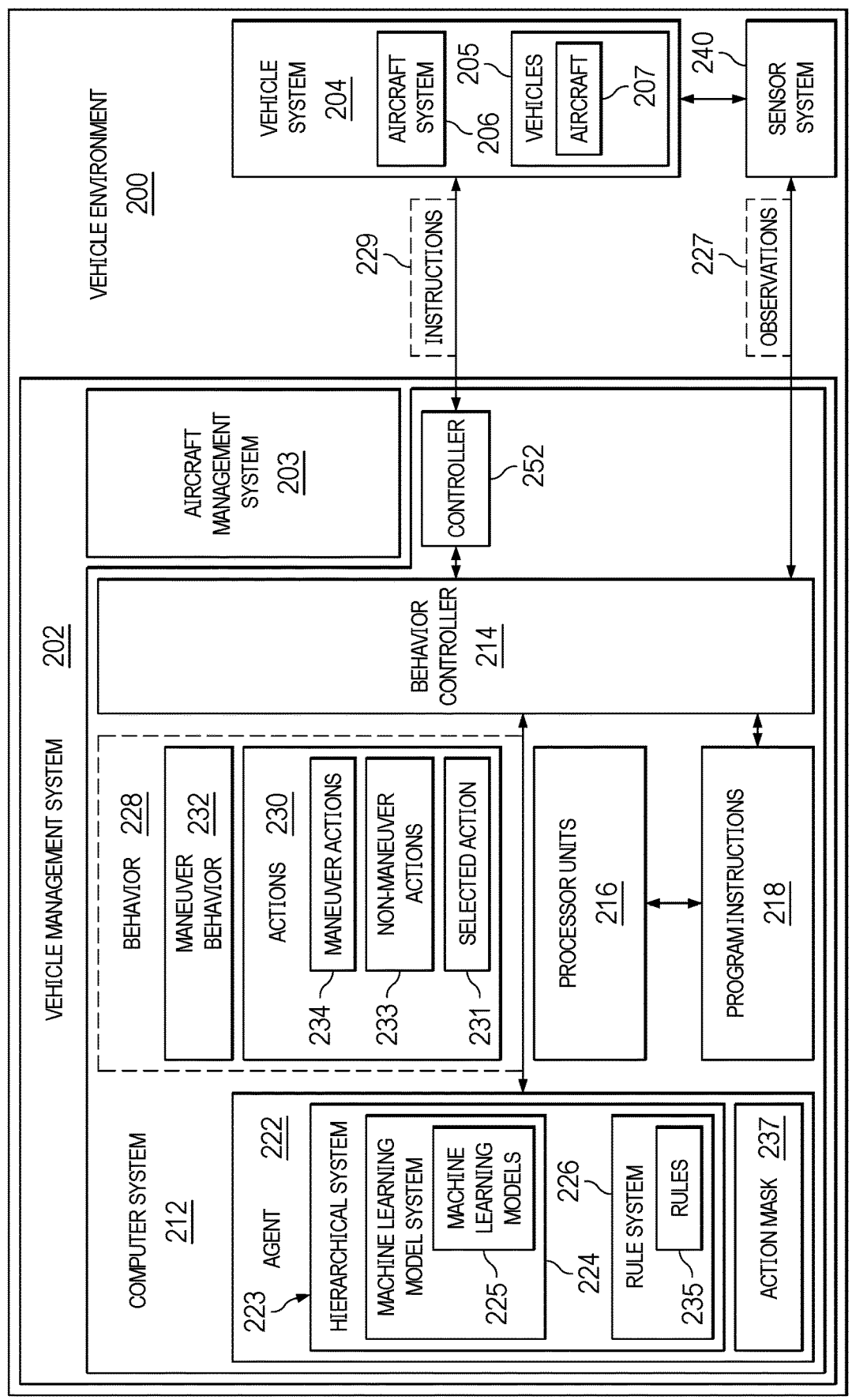
FIG. 2 is an illustration of a block diagram of a vehicle environment in accordance with an illustrative embodiment.

With reference now to FIG. 2, an illustration of a block diagram of a vehicle environment is depicted in accordance with an illustrative embodiment. In this illustrative example, vehicle environment 200 includes components that can be implemented in hardware such as the hardware shown in network data processing system 100 in FIG. 1.

In this illustrative example, vehicle management system 202 operates to control the operation of vehicle system 204. Vehicle system 204 is a set of vehicles 205. As used herein, "a set" of when used with reference to items means one or more items. For example, a set of vehicles 205 is one or more of vehicles 205. In one illustrative example, vehicle system 204 can take the form of aircraft system 206. With this example, the set of vehicles 205 is a set of aircraft 207. When vehicle system 204 is aircraft system 206, vehicle management system 202 is aircraft management system 203.

The set of vehicles 205 can take a number of different forms. For example, the set of vehicles 205 in vehicle system 204 can be selected from at least one of a mobile platform, an aircraft, a fighter, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a spacecraft, an automobile, or other vehicle.

As depicted, vehicle management system 202 comprises computer system 212 and behavior controller 214. Behavior controller 214 is located in computer system 212.

Behavior controller 214 can be implemented in software, hardware, firmware or a combination thereof. When software is used, the operations performed by behavior controller 214 can be implemented in program instructions configured to run on hardware, such as a processor unit. When firmware is used, the operations performed by behavior controller 214 can be implemented in program instructions and data and stored in persistent memory to run on a processor unit. When hardware is employed, the hardware may include circuits that operate to perform the operations in behavior controller 214.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium may be a network. The data processing systems may be selected from at least one of a computer, a server computer, a tablet, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in a computer system 212.

Further, the number of processor units 216 can be of the same type or different type of processor units. For example, a number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, behavior controller 214 operates to control the behavior of vehicle system 204. Behavior controller 214 uses agent 222 to determine behavior 228 for vehicle system 204. For example, agent 222 can control vehicle system 204 in the form of a single vehicle, a plurality of vehicles, a plurality of vehicles on a team, or some other type of vehicle system. In this example, vehicle system 204 can be at least one of vehicle system is selected from at least one of a vehicle in a simulation or a physical vehicle.

In this illustrative example, agent 222 is hierarchical system 223 comprising machine learning model system 224 and rule system 226. In this example, machine learning model system 224 is higher in the hierarchy as compared to rule system 226.

Machine learning model system 224 is comprised of a set of machine learning models 225. The set of machine learning models 225 is selected from at least one of a neural network, a reinforcement learning neural network, a multi-layer perceptron, a reinforcement learning machine learning model, a proximal policy optimization machine learning model, or some other suitable type of machine learning model.

In this example, rule system 226 is comprised of rules 235. Rules 235 can implement logic for selecting actions 230. This logic can take different forms. For example, the logic implemented in rules 235 can be in the form of bullying logic, conditional statements, state machines, fuzzy logic, or other types of logic.

Agent 222 is configured to determine behavior 228 vehicle system 204 to control the operation of vehicle system 204. Behavior 228 can be a set of actions 230. For example, behavior 228 can be an individual action or multiple actions performed by vehicle system 204. In other words, behavior 228 can be one or more of actions 230.

Behavior 228 can be determined by agent 222 in response to agent 222 receiving observations 227 for vehicle system 204. For example, behavior 228 can be a maneuver behavior selected from a group comprising a route vectoring, a route formation, an ingress vectoring, an ingress formation, an intercept, a missile intercept, a pure pursuit, a vectoring, a crank, a grinder, a pump, an egress, a vector relative to a primary enemy aircraft, an aircraft vector relative to a primary enemy aircraft centroid, and a missile vector relative to a primary enemy missile centroid.

In this illustrative example, observations 227 observed by vehicle system 204 can be made using sensor system 240. Sensor system 240 comprises sensors that generate data that form observations 227 for vehicle system 204. The sensors in sensor system 240 can be located in at least one of vehicle system 204 or in vehicle environment 200 around vehicle system 204. The sensors in sensor system can be at least one of actual physical sensors or virtual sensors in a simulation.

In this illustrative example, sensors in sensor system 240 are sources of data that can be sent in data streams in observations 227. The data that forms observations 227 can include a state of vehicle system 204 and information about the environment around vehicle system 204. This data can be in the form of parameters that sensor system 240 can detect and measure. As a result, sensor system 240 can identify data for observations 227 for vehicle system 204.

In this example, machine learning model system 224 is trained to receive observations 227 observed by vehicle system 204 and select behavior 228 for vehicle system 204 in response to receiving observations 227 observed by vehicle system 204. Further in this example, rule system 226 is configured to select a set of actions 230 to execute behavior 228 for vehicle system 204 in response to a selection of behavior 228 by the machine learning model system 224. Thus, in hierarchical system 223, machine learning model system 224 selects behavior 228 and rule system 226 selects actions 230 that are performed to implement behavior 228.

Further, rule system 226 can also select other actions in actions 230 that are not performed to implement behavior 228 selected by machine learning model system 224. For example, rule system 226 can select one or more of actions 230 that form behavior 228. With this example, the selection can be made without a selection of behavior 228 by machine learning model system 224. In other words, rule system 226 can select one or more of actions 230 to form behavior 228 rather than implementing behavior 228 based on a selection of behavior 228 by machine learning model system 224.

In one illustrative example, rule system 226 is configured to receive observations 227 for use in selecting one or more of actions 230. With this example, rule system 226 selects selected action 231 in response to receiving observations 227. Selected action 231 can be for a different behavior type from a behavior type for behavior 228 selected by machine learning model system 224. Selected action 231 can be one of selecting a weapon, targeting an object, firing the weapon, capturing an image, or some other action.

In one illustrative example, vehicle system 204 takes the form of aircraft system 206. With this example, agent 222 can select behavior 228 in response observations 227 for aircraft 207.

Further, in this example, machine learning model system 224 receives observations 227 observed by aircraft system 206. In this example, machine learning model system 224 is trained to select behavior 228 selected from a group comprising maneuver behavior 232 and non-maneuver actions 233 in response to receiving observations 227 for aircraft system 206.

In response, machine learning model system 224 selects maneuver behavior 232 for behavior 228 for aircraft system 206.

This behavior can be a coordinated behavior or an individualized behavior for aircraft 207 in aircraft system 206. In other words, when more than one aircraft is present in aircraft 207, those aircraft can be applied in a coordinated manner.

For example, all aircraft in aircraft 207 can perform route formation in which aircraft 207 flight information. As another example, maneuver behavior 232 can be an intercept behavior in which aircraft 207 vectors or are directed towards an intercept point.

With individualized behavior, one aircraft performs one maneuver while another aircraft performs a different maneuver. For example, one aircraft may perform intercept maneuver while another aircraft performs a pure pursuit maneuver. In the pure pursuit maneuver, the aircraft vectors or flies towards the location of a target aircraft or other object.

Rule system 226 selects a set of maneuver actions 234 for the set of actions 230. Maneuver actions 234 are actions performed to implement maneuver behavior 232. These maneuver actions can be actions such as a velocity change, a speed change, or others suitable action that can be performed to implement maneuver behavior 232.

In these illustrative examples, behavior controller 214 can increase at least one of increased speed or realism by agent 222 determining behavior 228 using observations 227. For example, action mask 237 can be sent to agent 222 for use by machine learning model system 224 to select behavior 228 in a manner that avoids selection of an invalid behavior.

This invalid behavior is a behavior that cannot occur in the current situation of state of the situation. For example, route formation is an invalid maneuver behavior for maneuver behavior 232 when only a single aircraft is present in aircraft system 206. As another example, intercept behavior is another maneuver behavior that cannot be selected when no adversarial aircraft are present.

Further in this example, non-maneuver actions 233 that can be selected by machine learning model system 224 include at least one of a weapon guidance, a weapon select, and a weapon firing. In this example, maneuver behavior 232 is for a particular maneuver that can be performed by aircraft system 206.

Rule system 226 can also select a set of non-maneuver actions 233 in response to receiving observations 227. Selection of these one or more of non-maneuver actions 233 form behavior 228. This type of selection by rule system 226 can be made in addition to or in place of machine learning model system 224 for selecting non-maneuver actions 233.

In illustrative example, action mask 237 can identify behaviors that cannot be selected. In another example, action mask 237 can identify behaviors that can be selected. As a result, the use of action mask 237 can reduce the possibility that invalid behaviors are selected by machine learning model system 224.

With the selection of behavior 228 for vehicle system 204, behavior controller 214 can control vehicle system 204 to perform behavior 228. For example, behavior controller 214 can use controller 252 implement behavior 228 and vehicle system 204.

In this example, controller 252 is an interface used to communicate with vehicle system 204 and operations used to control vehicle system 204. Controller 252 can be at least one of hardware or software.

Controller 252 can control vehicle system 204 using behavior 228. In other words, controller 252 can control the actions of vehicle system 204 using behavior 228.

In this illustrative example, controller 252 can translate behavior 228 into instructions 229 that are recognized and used by vehicle system 204. For example, behavior 228 can be comprised of one or more of actions 230. Instructions 229 can be generated to implement each one of these actions. Instructions 229 can include, for example, commands, data, parameters, program code, and other information used to cause vehicle system 204 to implement behavior 228. These instructions are in a format that is used by vehicle system 204.

For example, controller 252 receives behavior 228 from agent 222, and generates instructions 229 using behavior 228. Controller 252 sends instructions 229 to vehicle system 204. Instructions 229 are in a form or format that can be used to control vehicle system 204.

In one example, instructions 229 control behavior 228 of aircraft 207 in aircraft system 206 individually. In another example, instructions 229 control behavior 228 of aircraft 207 in aircraft system 206 in a coordinated manner. When more than one aircraft is present in aircraft 207, instructions can be sent to each of the aircraft in aircraft system 206 for use in implementing behavior 228.

In one example, agent 222 and other agents can be used in training scenarios such as aircraft training. This aircraft training can include commercial aircraft, military aircraft, and other types of aircraft. Scenarios can be created with opposing teams of aircraft in which one team can be controlled by agent 222 and another team can be controlled by human operators who are training on a particular aircraft. This training can take place in simulators, actual aircraft, or using other types of computing devices that can present behaviors of the aircraft to the human operators in the training session. Simulations can also be run in which both sides are controlled by agents.

Thus, vehicle management system 202 uses hierarchical system 223 that includes machine learning model system 224 and rule system 226 in agent 222. In this example, the machine learning model system can select behaviors and rule system select and perform actions to implement the behaviors. Further, rule system 226 can select actions to implement behaviors that are not selected by machine learning model system 224. In yet other illustrative examples, machine learning model system 224 can select behaviors and actions for the behaviors depending on the particular implementation.

In one illustrative example, one or more solutions are present that overcome a problem with controlling aircraft with a desired level of realism for a simulation or live training exercise. In the different illustrative examples, an agent is provided that has a hierarchical system that enables faster processing of observations to select behaviors for an aircraft system. The hierarchical system can also provide for increased accuracy and selected behaviors. With this type of architecture, the selection of the behaviors can occur with increased speed and realism.

In illustrative examples, the hierarchical architecture includes a machine learning model system and a rule system. The machine learning model system is on a higher level than the rule system with respect to the selection of behaviors. The machine learning model system selects a behavior and the rule system can select actions to implement the behavior selected by the machine learning model.

Additionally, action masks can be used to avoid selection of invalid behaviors by the machine learning model system. With the use of an action mask, faster selection of behaviors from processing observations. The selections can also occur with greater accuracy by eliminating invalid selections.

Computer system 212 can be configured to perform at least one of the steps, operations, or actions described in the different illustrative examples using software, hardware, firmware or a combination thereof. As a result, computer system 212 operates as a special purpose computer system in which behavior controller 214 in computer system 212 enables controlling vehicle systems. In particular, behavior controller 214 using agent 222 computer system 212 into a special purpose computer system as compared to currently available general computer systems that do not have behavior controller 214 with agent 222.

Agent 222 includes a machine learning model system and a rule system that form a hierarchical system that can select behaviors for vehicle systems as a practical application of steps for controlling the behavior of vehicle systems. Further, the agent in the illustrative examples can be configured to provide for synchronized control of vehicles in a vehicle system or individual control of vehicles in a vehicle system. In other words, with synchronized actions, one action is performed by both vehicles. With individual actions, a different action can be performed by each vehicle.

In the illustrative examples, the agent with the machine learning model system and the rule system can provide these types of controls for vehicles in vehicles systems in a manner that allows for selecting and implementing behaviors in real time during the training exercise, a simulation, or other scenario. For example, the agent in the different illustrative examples can be used to control a vehicle system in a real-life situation.

As another example, a real physical vehicle system can be controlled to perform a mission or react to real physical vehicles that may be adversarial vehicles. At least one of increased speed in selecting behaviors or accuracy in selecting behaviors can occur using the agent having the hierarchical system containing a machine learning model system and a rule system to select behaviors and actions to implement behaviors as well as selecting actions for behaviors to control one or more vehicles in a vehicle system.

The illustration of vehicle environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, machine learning model system 224 can include other components in addition to a set of machine learning models 225. For example, machine learning model system 224 can include the function or component to apply action mask 237 to the potential actions output by a machine learning model in machine learning models 225.

For example, the machine learning model can output potential behaviors and probabilities for the potential behaviors. Action mask 237 can be used to remove invalid behaviors that may be present in the potential behaviors. Further, the function can be present to normalize the probabilities of the remaining behaviors one or more invalid behaviors are removed from the potential behaviors output by the machine learning model. Additionally, the function or component can be used with observations 227 input into the machine learning model.

As another illustrative example, if a behavior selector is not implemented as part of a machine learning model, that behavior selection can be a component that selects the behavior based on the potential behaviors of the probabilities output by the machine learning model.

As yet another example, sensor system 240 can also include communications devices. As a result, observations 227 can also include communications such as voice communications, data, or other types of communications that may be transmitted.

Figure 3:
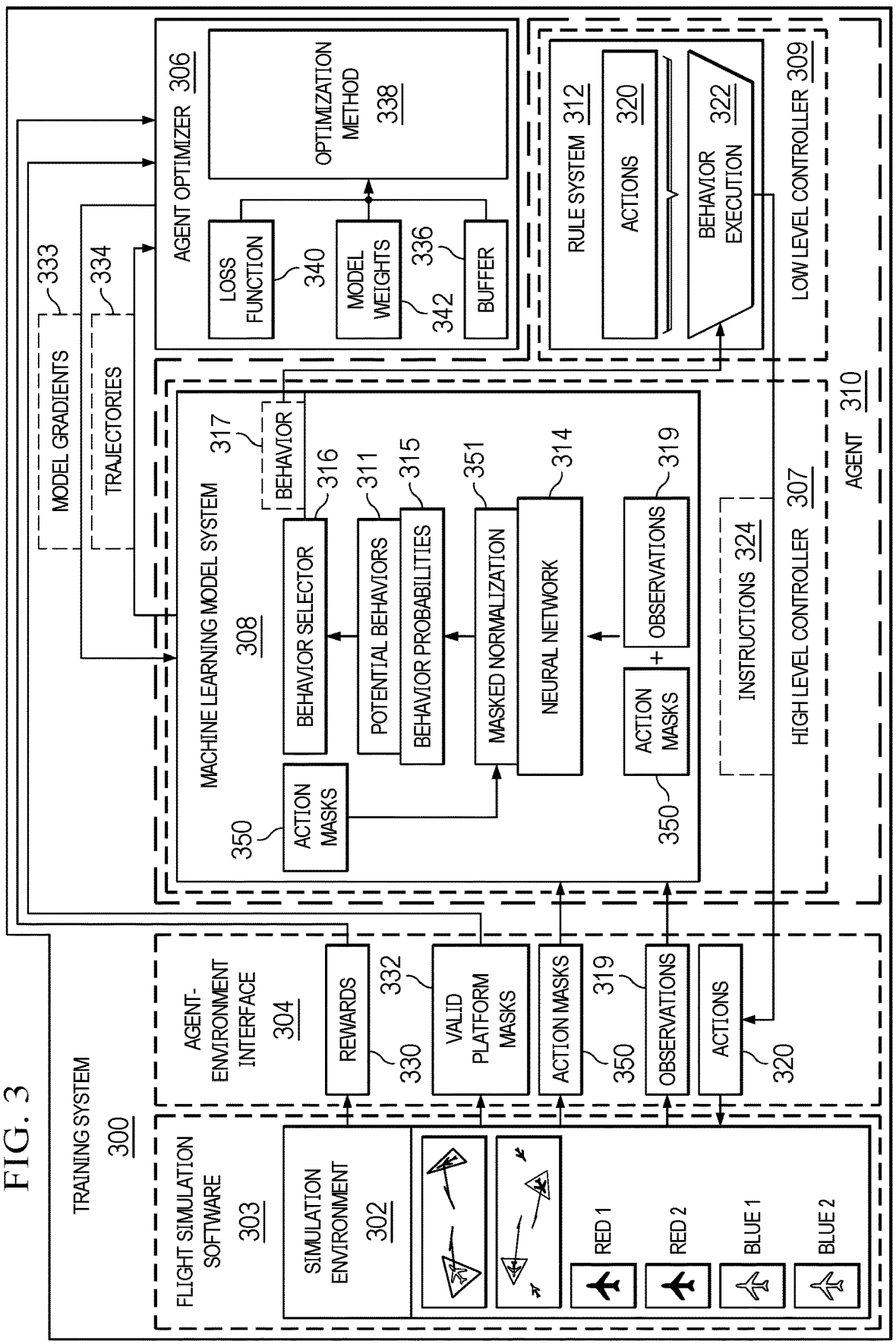
FIG. 3 is an illustration of a block diagram of a training system for training a machine learning model system to select behaviors for a vehicle system in accordance with an illustrative embodiment.

With reference next to FIG. 3, an illustration of a block diagram of a training system for training a machine learning model system to select behaviors for a vehicle system is depicted in accordance with an illustrative embodiment. In this illustrative example, training system 300 is an example of a training system that can be used to train machine learning model system 224 in agent 222 in FIG. 2.

As depicted, training system 300 comprises simulation environment 302, agent environment interface 304, and agent optimizer 306. These components can be used to train machine learning model system 308 in agent 310. As depicted, agent 310 also includes rule system 312. In this example, the training is performed using a reinforcement learning algorithm.

In this illustrative example, agent environment interface 304 provides an interface for agent optimizer 306, machine learning model system 308, and rule system 312 to exchange information with simulation environment 302.

Simulation environment 302 is an environment run by flight simulation software 303 to generate observations 319 for input to machine learning model system 308 as part of a training process. This flight simulation software can be implemented using any software used to simulate flight of aircraft. In these examples, flight simulation software 303 can simulate the flight of aircraft for two or more different teams in adversarial situations in simulation environment 302.

For example, the simulation in simulation environment 302 can be for a two versus two encounter. With this simulation, two teams of aircraft are present in which each team has two aircraft.

Agent environment interface 304 identifies observations 319 output from simulation environment 302 that are relevant to the aircraft handled by agent 310. In other words, observations 319 are observations that agent 310 can observe for the aircraft managed by agent 310.

Observations 319 can include, for example, friendly to enemy aircraft information, friendly to enemy missile information, ownership information, tracks of aircraft, and other information. Tracks for the aircraft can include, for example, relational speed and geometric information such as relative bearings, closing speeds, cross ranges, the down ranges, and other information. In this example, this information in a track defines geometric and speed information of an aircraft relative to another object such as an aircraft or other object. The geometric information can identify positions, orientations, and routes between vehicles and other objects. Observations 319 sent back to machine learning model system 308 can also include information associated with the defeated or imperceptible aircraft.

Agent environment interface 304 sends observations 319 to agent 310. In this example, observations 319 can be used by machine learning model system 308 in agent 310. These observations are used as inputs to neural network 314 which outputs potential behaviors 311 and behavior probabilities 315 for potential behaviors 311.

In this example, behavior selector 316 in machine learning model system 308 can select behavior 317 from potential behaviors 311 using behavior probabilities 315 for potential behaviors 311.

The selection of behavior 317 is sent to rule system 312. In turn, behavior execution 322 in rule system 312 selects a set of actions 320 that are used to implement behavior 317.

In this depicted example, actions 320 can be sets of actions for maneuvering behaviors. In other words, each set of actions in the sets of actions 320 can be associated with an identifier for a particular maneuver behavior. In one illustrative example, the maneuver behavior can be selected from a group comprising vehicle evade, vehicle pursue, team evade, team pursue, route formation, and other suitable maneuver behaviors.

In this illustrative example, behavior selector 316 can output a value for a particular behavior. This value is used by behavior execution 322 to identify the set of actions 320 that implement that particular behavior. Behavior execution 322 generates instructions 324 for the set of actions 320 selected for behavior 317.

As depicted, behavior execution 322 sends instructions 324 to agent environment interface 304 which interprets instructions 324 to generate the set of actions 320 in a form recognized by simulation environment 302. Agent environment interface 304 sends the set of actions 320 to simulation environment 302.

In this illustrative example, simulation environment 302 takes these inputs of the set of actions 320 to generate new observations for observations 319 that can be sent back to machine learning model system 308 to generate new actions that are then sent back to simulation environment 302.

In this illustrative example, machine learning model system 308 can be trained through this interaction with simulation environment 302 using the repeated generation of observations 319 and selection of actions 320. In this example, machine learning model system 308 is high level controller 307 and rule system 312 is low-level controller 309 in agent 310. Machine learning model system 308 selects behavior 317 and rule system 312 select actions 320 to execute behavior 317 in this example. These components form a hierarchical system for performing different behaviors.

In this illustrative example, machine learning model system 308 can be updated or optimized using agent optimizer 306. Agent environment interface 304 can provide information to agent optimizer 306 to perform this updating of weights in neural network 314 in machine learning model system 308.

As depicted, agent environment interface 304 receives rewards 330 from simulation environment 302 and sends this information to agent optimizer 306. Rewards 330 indicates how well machine learning model system 308 is performing in simulation environment 302. For example, rewards 330 provides a measure of how the results of actions 320 are executed in simulation environment 302.

In this illustrative example, a reward in rewards 330 can be based on meeting selected objectives such causing an adversarial aircraft to retreat, preventing an adversarial aircraft from reaching a particular location, or other objectives. Rewards 330 can have a positive or negative value depending on whether an objective was met. For example, with a team lost, rewards 330 is a negative value. A team win results in rewards 330 have a positive value. Rewards 330 can be used with observation and action pairs to determine model gradients 333.

In this example, agent environment interface 304 can create valid platform masks 332 using observations 319. Valid platform masks 332 identify which aircraft in simulation environment 302 are live or no longer operational or present in simulation environment 302. These masks can be used to indicate which aircraft may have contributed to particular observations and with respect to rewards 330.

In this illustrative example, agent optimizer generates model gradients 333 using rewards 330, valid platform masks 332, and trajectories 334 stored in buffer 336. This historical data in buffer 336 can be used as part of the process for determining model gradients 333. Buffer 336 can store information such as trajectories 334 vehicle. In this example, trajectories 334 are stored in buffer 336 by machine learning model system 308.

Further, this buffer can also store observations, actions, and rewards resulting from the actions. This history can be used with loss function 340 to determine model gradients 333.

In this example, a trajectory is information about an aircraft. For example, the trajectory can include relational speeds and geometric information such as relative bearings, closing speeds, cross and down ranges, XYZ relative speeds as well as other information about the movement of the aircraft controlled by the agent 310. In this example, actions 320 and observations 319 are also stored in buffer 336 by agent environment interface 304.

In this example, optimization method 338 uses loss function 340, model weights 342, and trajectories 334 stored in buffer 336 to generate model gradients 333 and send model gradients 333 to machine learning model system 308 for implementation in neural network 314. Model gradients 333 are partial derivatives of loss function 340 with respect to model weights 342 used in neural network 314.

In this example, model weights 342 are the current weights used in neural network 314. Loss function 340 measures how well neural network 314 is performing. Further in this example, model weights 342 are updated with model gradients 333 to reflect the current weight being used by neural network 314.

In training neural network 314 in machine learning model system 308, model gradients 333 can be used to adjust weights within neural network 314. Model gradients 333 provide information about how weights should be adjusted in neural network 314 to decrease the loss as determined using loss function 340.

In this example, model gradients 333 can be generated when history buffer becomes full. In another example, model gradients 333 can be generated each time rewards 330 are received from simulation environment 302.

With the use of model gradients 333, neural network 314 can be optimized in selecting behavior 317 in response to receiving observations 319 from simulation environment 302. The use of rewards 330 to train neural network 314 is part of the reinforcement learning process.

Further in this example, machine learning model system 308 can employ action masks 350. Action masks 350 can be used to determine what behavior can be selected by neural network 314. In this illustrative example, agent environment interface 304 can create action masks 350 using observations 319. For example, agent environment interface 304 can create an action mask in which team-based actions are unavailable in response to observations 319 indicating that the aircraft controlled by agent 310 is the only aircraft on the team.

In this example, action masks 350 can be input with observations 319 into neural network 314. This input can indicate what behaviors are invalid behaviors with respect to observations 319.

Further, action masks 350 can be used with masked normalization 351 to determine which ones of potential behaviors 311 output from neural network 314 can be selected by behavior selector 316. For example, action masks 350 can be used by masked normalization 351 to remove or mask invalid potential behaviors in potential behaviors 311. As a result, only valid potential behaviors in potential behaviors 311 are sent to behavior selector 316. Masked normalization 351 also normalizes the probabilities to take into account probabilities that have been removed from behavior probabilities 315 from masking out one or more of potential behaviors 311.

Behavior selector 316 selects behavior 317 based on potential behaviors 311 and behavior probabilities 315 received from masked normalization 351. Behavior 317 is then sent to behavior execution 322. Behavior execution 322 selects actions 320 to implement behavior 317. Behavior execution 322 sends instructions 324 to agent environment interface 304 to perform actions 320. Thus, with the use of action masks 350, machine learning model system 308 can at least one of select behavior 317 more quickly or select behavior 317 with increased accuracy.

Thus, machine learning model system 308 in agent 310 selects behaviors that are implemented as actions using rule system 312 in response to receiving observations 319. These actions are sent to simulation environment 302 which generates new observations based on these actions. Further, rewards 330 are received from simulation environment 302 that are used by agent optimizer 306 to generate model gradients 333 that are used to update weights within neural network 314.

Although the description of this training system 300 has been described with respect to aircraft, this example is not meant to limit the manner in which other illustrative examples can be implemented. For example, in other illustrative examples, training system 300 can be used to train a machine learning model system using other types of vehicles in addition to or in place of aircraft.

Figure 4:
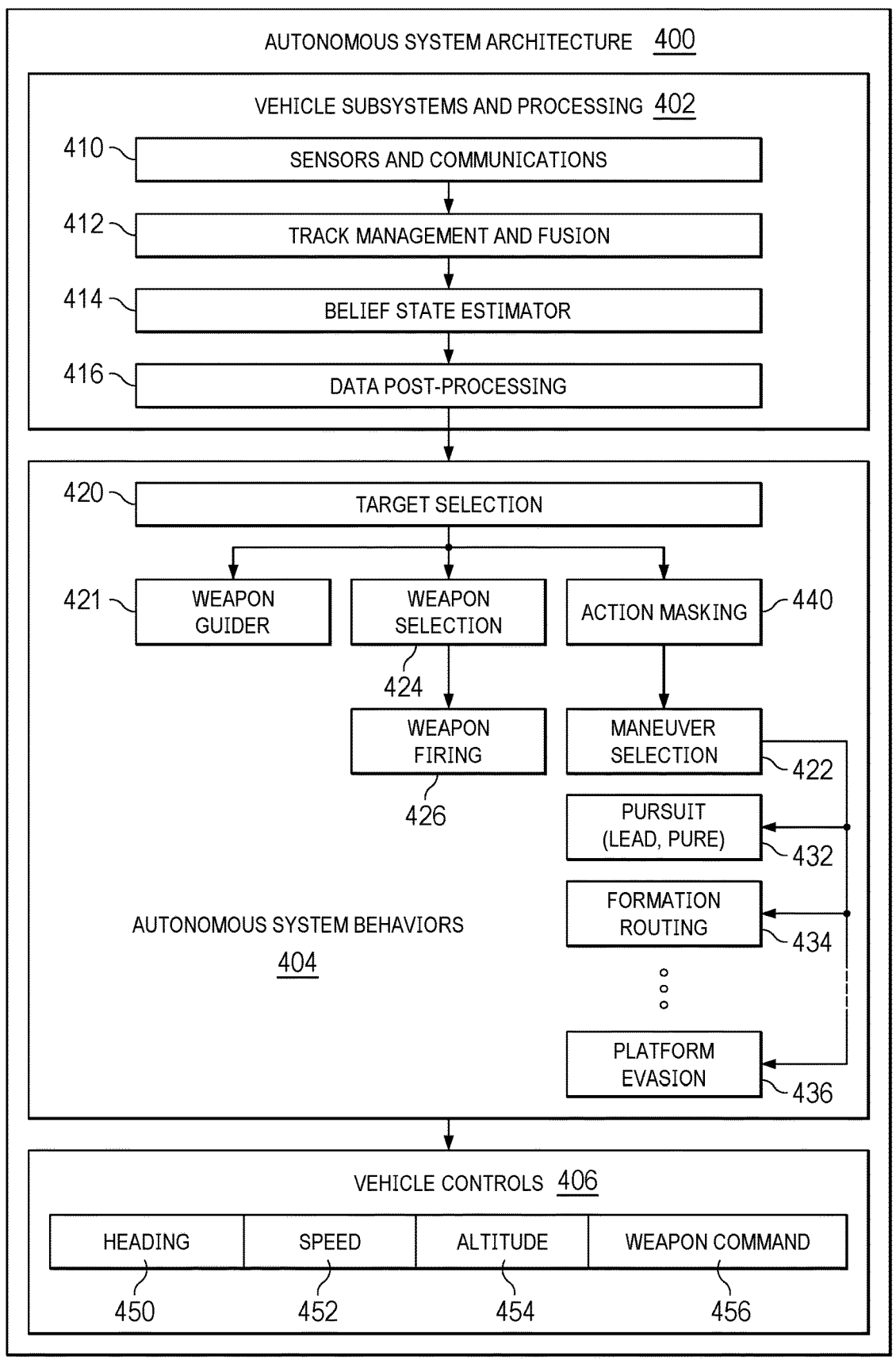
FIG. 4 is an illustration of a functional block diagram of an agent in accordance with an illustrative embodiment.

Turning next to FIG. 4, an illustration of a functional block diagram of an autonomous system architecture for controlling a vehicle system is depicted in accordance with an illustrative embodiment. In this illustrative example, autonomous system architecture 400 can be used to implement agent 222 in FIG. 2. Autonomous system architecture 400 can be implemented in agent 222 and can autonomously control the operation of multiple vehicles in vehicle system 204.

As depicted, autonomous system architecture 400 comprises functional components that process observations to select and control a vehicle system to implement behaviors in response to the observations. As depicted, autonomous system architecture 400 comprises vehicle subsystems and processing 402, autonomous system behaviors 404, and vehicle controls 406.

In this illustrative example, vehicle subsystems and processing 402 processes observations for use by autonomous system. Autonomous system behaviors 404 selects a behavior for the vehicle system using the observations processed by vehicle subsystems and processing 402. Further In this example, autonomous system behaviors 404 can select actions for the behavior. Vehicle controls 406 are used to implement the actions in the vehicle system.

Autonomous system architecture 400 can receive observations a single vehicle or several vehicles in a vehicle system. This architecture can control one or more vehicles in the vehicle system. The control of multiple vehicles can be a coordinated control or an individual control. Coordinated control results in the vehicles performing the same behavior while individual control can result in different vehicles having different behaviors.

In this example, vehicle subsystems and processing 402 includes a number of components to process observations. As depicted, vehicle subsystems and processing 402 includes sensors and communications 410, track management and fusion 412, belief state estimator 414, and data post-processing 416.

Sensors and communications 410 identify observations that are detected by sensors and communications in the vehicle system. In other words, this component can identify information that is perceived by a particular vehicle. For example, the vehicle perceives or receives track data from its onboard sensor and communication devices with other vehicles or platforms. The track data can be, for example, data including enemy and friendly positions, orientations, speeds, platform type, and other data.

Track management and fusion 412 can manage data about the systems and fuse data from different subsystems in the observations. In this example, the tracks managed by the component is a group of information for a particular vehicle or platform. The track information can include an identification of a vehicle, whether the vehicle is friendly or not, the position of the vehicle, a speed, the last time that the vehicle was seen, and other information about the vehicle. The fusion can combine information about a vehicle seen by two vehicles in a vehicle system.

Multiple tracks can be received from the various hardware, sensors, electronics onboard in the vehicle. Multiple "raw tracks" may be acquired at slightly different time frames but pertain to the same vehicle. These 'raw tracks' can be combined a single unified track for each perceived perceive vehicle. Pre-existing tracks are updated and outdated tracks might be dropped.

Belief state estimator 414 is used to filter and denoise data to provide a more accurate estimation about the state of the vehicle system. Belief state estimator 414 can be implemented using a Kalman filter, an extended Kalman filter, and other types of filters.

Data post-processing 416 formats the data from the observations. Data post-processing 416 places the data into a format that is used by the machine learning model system and the rule system that implements autonomous system behaviors 404. This component can also select information that is used, and discard information not needed by the machine learning model system and the rule system that implements autonomous system behaviors 404.

For example, this component can collect the relevant, de-noised track data based on the specifications of the interface for the machine learning model. The relevant data is filtered, scaled, normalized, merged, and organized for input to the machine learning model system.

In this example, autonomous system behaviors 404 can be implemented using a machine learning model system and a rule system. Autonomous system behaviors 404 receives the process observations from vehicle subsystems and processing 402 and uses this data to select behaviors for the vehicle system. As depicted, autonomous system behaviors 404 includes target selection 420, weapon guider 421, weapon selection 424, and weapon firing 426. These selection components are implemented using rules in a rule system such as rule system 226 in FIG. 2.

Target selection 420 identifies enemy vehicles and can provide a priority for enemy vehicles. In this example, other rule-based action selections can be based on the target selected by target selection 420. For example, weapon guider 421 and weapon selection 424 can be based on the target selected using target selection 420. Weapon selection 424 can select the type of weapon to be used with respect to a particular vehicle. Weapon guider 421 can aim a weapon or guide a missile or other object.

In the hierarchy of rules, weapon firing 426 is based on the action selected by weapon selection 424.

In this example, the autonomous system behaviors 404 also includes maneuver selection 422. The selection of maneuvers by maneuver selection 422 in this example is implemented using a machine learning model system such as machine learning model system 224 in FIG. 2. The actions used to implement a particular maneuver are selected by the rule system.

For example, maneuver selection 422 can select a maneuver such as pursuit 432, formation routing 434, and platform evasion 436. The rule system selects the actions to perform a maneuver selected by maneuver selection 422.

In this example, action masking 440 can be implemented to avoid selection of invalid maneuvers. For example, formation routing can be an invalid maneuver when only a single vehicle is present in the vehicle system. In this manner, faster and more accurate selection of maneuvers can occur using action masking 440.

With the selection of actions for by the rule system for targets and the selection of actions for maneuvers using the machine learning model system and the rule system, these actions can be used to control the behavior of the vehicle system. In this illustrative example, the actions can be sent as instructions to vehicle controls 406 to control the vehicle system.

These instructions are sent in a form that are used by the vehicle system to control operation of the vehicle system. For example, instructions can be sent to select heading 450, speed 452, altitude 454. Additional instructions can be sent for weapon command 456 to fire a particular weapon. As a result, the instructions generated can be used to control a vehicle system in a simulation or an actual physical vehicle system.

Figure 5:
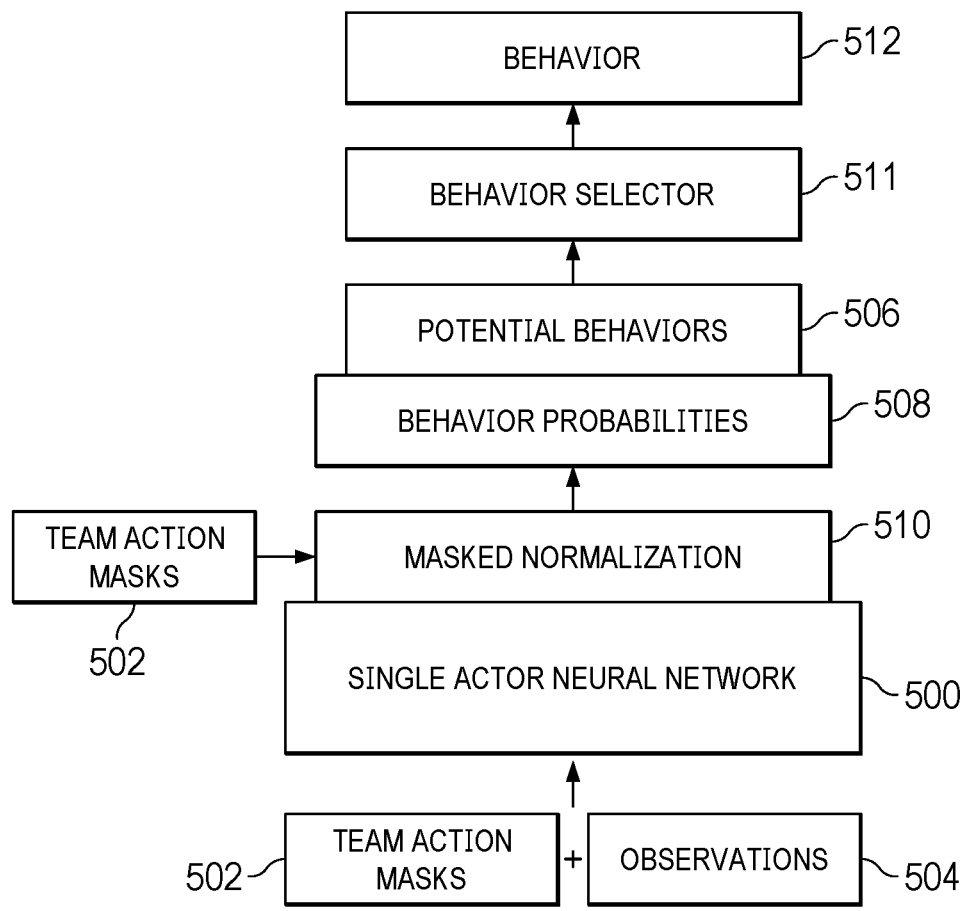
FIG. 5 is an illustration of a single actor neural network in accordance with an illustrative embodiment.

Turning next to FIG. 5, an illustration of a single actor neural network is depicted in accordance with an illustrative embodiment. In this example, single actor neural network 500 is an example of an implementation for a machine learning model in machine learning model system 224 used to control multiple vehicles in a vehicle system in a coordinated manner.

As depicted, single actor neural network 500 receives team action masks 502 and observations 504 as an input to select a behavior. Team action masks 502 identify what behaviors cannot be selected based on observations 504.

In response, single actor neural network 500 outputs potential behaviors 506 and behavior probabilities 508 for potential behaviors 506. This output is modified using action masks to remove any potential behaviors that may be invalid based on observations 504. Team action masks 502 are input into masked normalization 510. This component removes any invalid potential behaviors and normalizes behavior probabilities based on the remaining potential behaviors.

Behavior selector 511 selects behavior 512 from potential behaviors 506 based on behavior probabilities 508. In this example, behavior 512 can be performed by all of the vehicles in a vehicle system.

Figure 6:
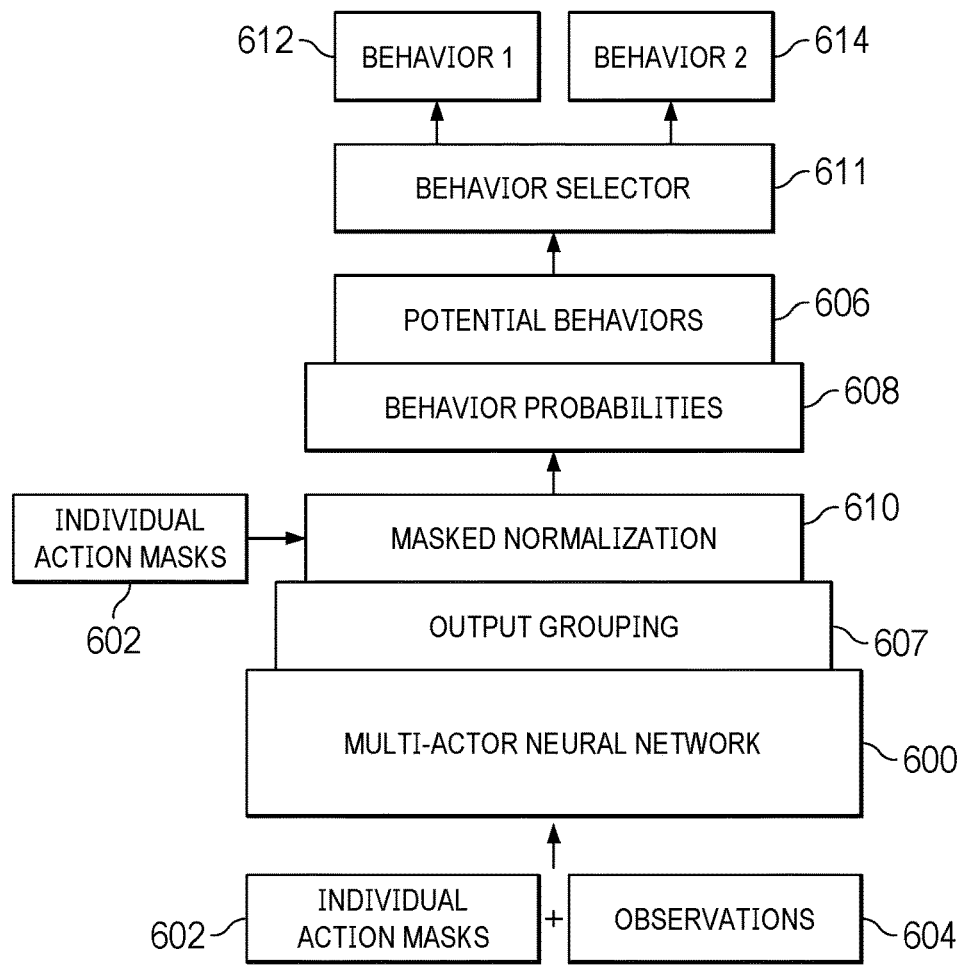
FIG. 6 is an illustration of a multi-actor neural network in accordance with an illustrative embodiment.

With reference next to FIG. 6, an illustration of a multi-actor neural network is depicted in accordance with an illustrative embodiment. In this example, multi-actor neural network 600 is an example of an implementation of a machine learning model in machine learning model system 224 in an individual manner.

As depicted, multi-actor neural network 600 receives individual action masks 602 and observations 604 as an input to select a behavior for each vehicle in a vehicle system. Individual action masks 602 identify behaviors that cannot be selected based on observations 604. Each of individual action masks 602 is unique to the vehicle for which the mask is created.

In response, multi-actor neural network 600 outputs potential behaviors 606 and behavior probabilities 608 for potential behaviors 606. These potential behaviors and probabilities are grouped by vehicle by output grouping 607.

This output can be modified using individual action masks 602 to remove any potential behaviors that may be invalid based on observations 504 for each of the vehicles in a vehicle system. Masked normalization 610 removes any invalid potential behaviors and normalizes behavior probabilities based on the remaining potential behaviors.

Behavior selector 611 selects a behavior for each of the vehicles from the potential behaviors. In this example, two vehicles are present and behavior selector 611 selects behavior 1 612 for a first vehicle and behavior 2 614 for a second vehicle from potential behaviors 506 based on behavior probabilities 608.

Although this example in FIG. 6 shows selecting different behaviors for two vehicles in a vehicle system, multi-actor neural network 600 can be configured to select behaviors for other numbers of vehicles. For example, multi-actor neural network 600 can be configured to select behaviors for three vehicles, five vehicles, ten vehicles, or some other number of vehicles.

Figure 7:
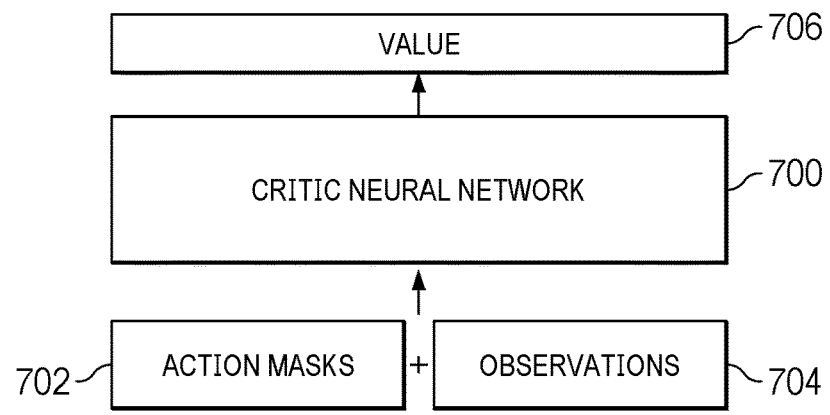
FIG. 7 is an illustration of a critic neural network in accordance with an illustrative embodiment.

Turning next to FIG. 7, an illustration of a critic neural network is depicted in accordance with an illustrative embodiment. Critic neural network 700 can be used in a training process with single actor neural network 500 and multi-actor neural network 600. For example, critic neural network 700 can be used with one of single actor neural network 500 and multi-actor neural network 600 to form a training agent. This training agent can also include and optimize a process to train single actor neural network 500 or multi-actor neural network 600.

In this example, critic neural network 700 receives action masks 702 and observations 704. Action masks 702 are the same action masks that are received by neural network being trained. For example, when the neural network is single actor neural network 500, action masks 702 take the form of team action masks 502. When in neural network is multi-actor neural network 600, action masks 702 take the form of individual action masks 602.

Observations 704 are the same observations that are received by the neural network being trained. In this example, critic neural network 700 outputs value 706. In other words, critic neural network 700 receives the same observations containing information about the state of the environment, vehicles, and other objects as neural as the actor neural network. This value is used to evaluate the quality of the current state of the simulator.

This network helps provide more information than just using rewards from a simulation. Critic neural network 700 can provide values based on a sequence of events.

In this example, critic neural network 700 is a neural network that receives observations and action masks. Critic neural network 700 uses these inputs to predict the quality of the current simulation state in the simulator. Critic neural network 700 tries to predict the value targets acquired from calculating a General Advantage Estimation (GAE) function. For example, critic neural network 700 is trained using historical observations, action masks prior training sessions or games run by the simulator, rewards, and target values derived from the reward history. Critic neural network 700 can also be referred to as a valued neural network.

Figure 8:
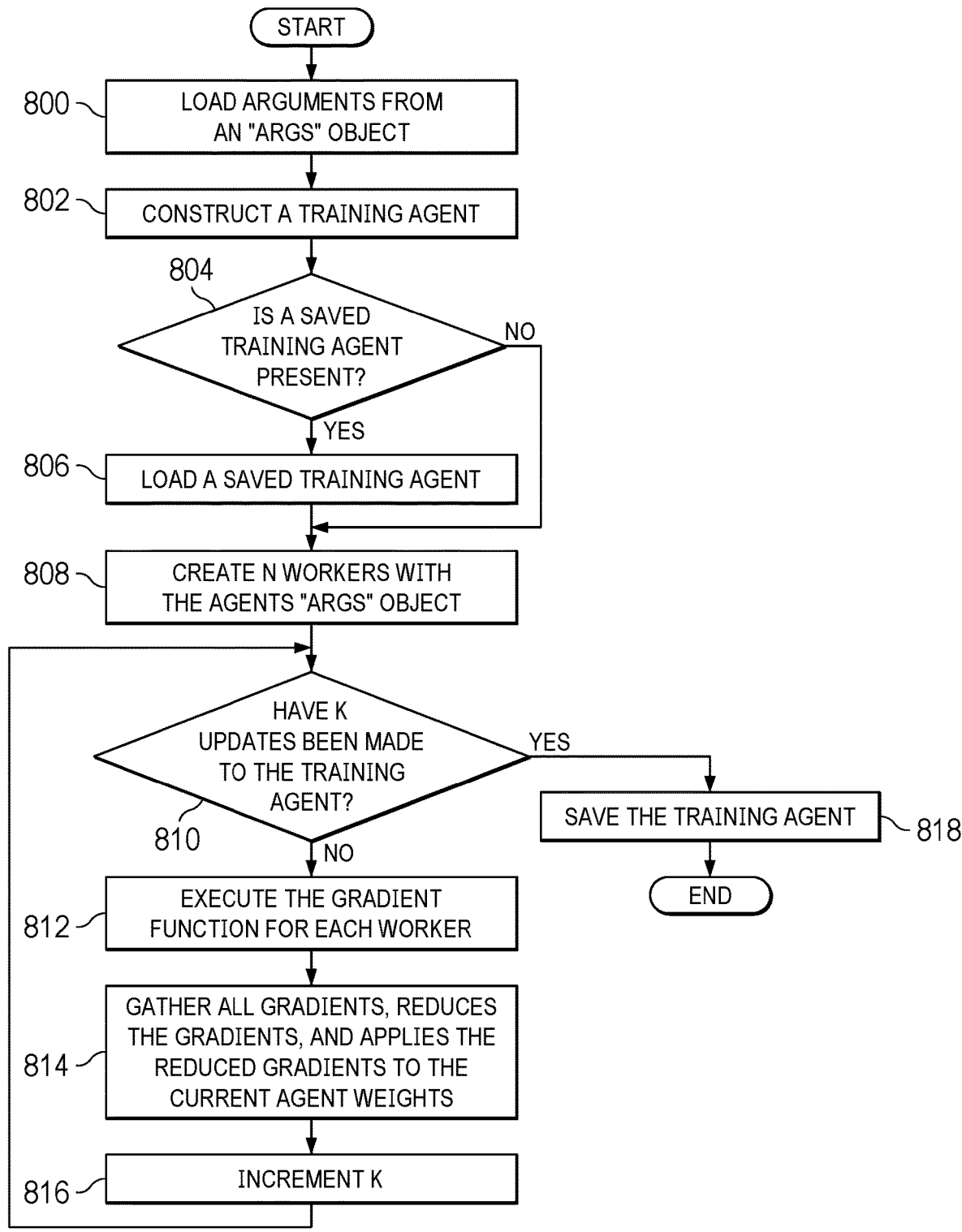
FIG. 8 is an illustration a flowchart of a process for training a machine learning model in accordance with an illustrative embodiment.

With reference now to FIG. 8, an illustration a flowchart of a process for training a machine learning model is depicted in accordance with an illustrative embodiment. The process illustrated in FIG. 8 can be implemented in hardware, software, or both. When implemented in software, the process can take the form of program instructions that are run by one of more processor units located in one or more hardware devices in one or more computer systems. For example, the process can be implemented in behavior controller 214 in computer system 212 in FIG. 2. This process can be used to train a machine learning model in machine learning model system 224. For example, this process can be used to train a machine learning model in the form of a neural network to select actions.

The process begins by loading arguments from an "args" object (operation 800). In operation 800, the "args" object can be a file or other data structure that contains information needed to initialize and run the agent in a simulation environment.

These arguments can include arguments for different components in the training agent including the actor neural network in the critic neural network. The arguments can specify the number of times the training should be performed, number of workers N, optimization parameters, loss functions, putting ingredients, and other information. The arguments can include information about the aircraft, environmental specific arguments for the simulation, information for adversaries, and other information running the simulation and performing updates.

The process constructs a training agent (operation 802). In operation 802, the training agent is comprised of an actor neural network, a critic neural network, and optimizer module. The actor neural network can be, for example, single actor neural network 500 in FIG. 5 or multi-actor neural network 600 in FIG. 6. The critic neural network can be, for example, critic neural network 700 in FIG. 7. The optimizer can be implemented using agent optimizer 306 in FIG. 3.

In operation 802, the optimizer module facilitates updates to actor and critic neural networks. The optimization used by the optimizer can be performed using an adaptive moment estimation (Adam) optimization process. In this example, neural networks are two neural networks that include a number of connected neural network layers and activation functions in between each neural network layer.

In this example, a selected number of neural network layers are created. The number of neural network use can be based on some user input or some default value. Each neural layer has a specified number of neurons (i.e., weights) to perform computations. The neural network neurons, or weights, can be constructed from various randomized distributions for both the actor neural network and critic neural network.

A determination is made as to whether a saved training agent is present (operation 804). In operation 804, a prior saved training agent can be loaded in place of a randomly initialized training agent. The saved training agent has neural network weights and optimizer parameters that were updated, refined, or updated and refined through a prior training process. Loading a saved agent can be performed to resume training under similar or dissimilar training conditions. The network weights, parameters, and architecture are stored in a file that can be parsed and reloaded to use for the prior saved training agent.

If a saved training agent is present, the process loads a saved training agent (operation 806).

The process creates N worker with the "args" object (operation 808). In operation 808, a worker is a process that is used to generate gradients. With reference again to operation 804, if a saved training agent is not present, the process also proceeds to operation 808. In this example, each worker is a process that uses a copy of the training agent with one or more slight variations in the training agent for the simulation. This copy of the training agent is referred to as a worker agent.

The process determines whether K updates have been made to the training agent (operation 810). In operation 810, K is the number of updates that should be performed in updating weights in the training agent in this process. If no updates have been made in operation 810, the process executes the gradient function for each worker (operation 812). The function in operation 812 runs a simulator, collects data, and turns updates to weights for the neural networks in the agent. These updates are gradients in this example.

The process gathers all gradients, reduces the gradients, and applies the reduced gradients to the current agent weights (operation 814). In operation 814, the process reduces the gradients using a summation or mean operation. The process increments K (operation 816). The process then returns to operation 810.

With reference again to operation 810, if K updates have been made to the training agent, the process saves the training agent (operation 818). The process terminates thereafter.

In this example, a worker is a separate process than the process in the flowchart in FIG. 9 as described below. The worker has its own memory and call-stack. The worker in this example runs the simulator, collects data, and updates its own copy of the training agent. The worker passes gradients back to the process in FIG. 8 in operation 814. The number of worker agents N is specified in the "args" input in operation 800.

The worker utilizes the arguments in an "args" object. The "args" object can specify parameters used within the gradient function for the worker. Multiple sets of parameters arguments can be present the "args" object for each worker that is created. In this example, the "args" object specifies number of simulation steps to run per function call, number of updates to perform, and amount of data (batch size) per update, among others, within the workers gradient function.

The "args" object specifies the parameters for the simulator and optimizer constructed within the 'worker process'. The simulator receives paths to files defining the Monte Carlo process and simulator input/output interface for retrieving observations and receiving 'agent' actions. The Adam optimizer receives its parameters, such as 'learning rate', from the "args" object.

Figure 9:
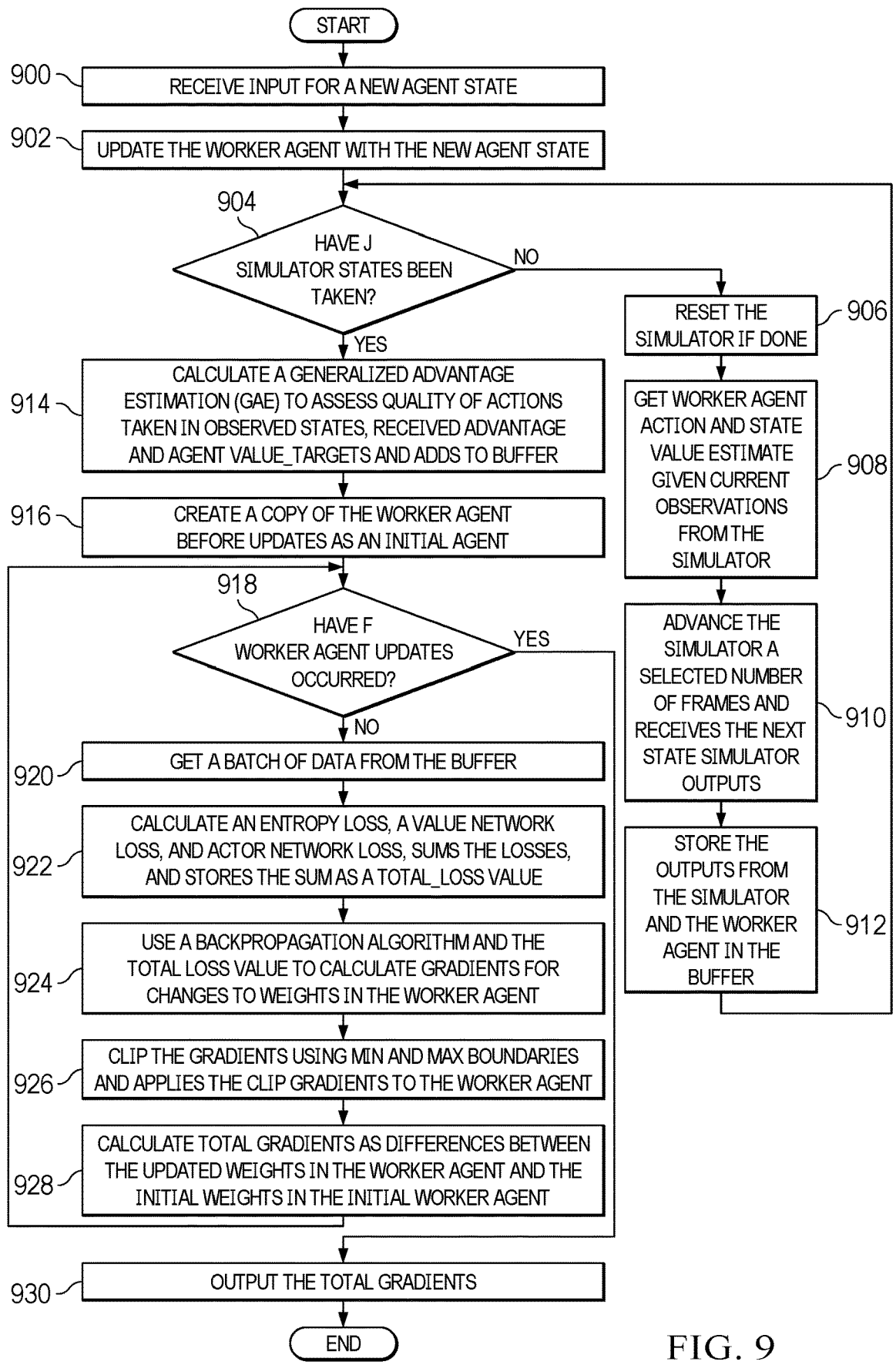
FIG. 9 is an illustration a flowchart of a process for a worker in accordance with an illustrative embodiment.

Turning to FIG. 9, an illustration of a flowchart of a process for a worker is depicted in accordance with an illustrative embodiment. This flowchart is an example of an implementation of operation 812 in FIG. 8. In this example, the worker process determines gradients using a copy of the training agent in FIG. 8 with one or variations. This copy of the training agent is the worker agent. These variations form a new state in the copy of the training agent that forms a worker agent as compared to the original state from the training agent.

The process begins by receiving input for a new agent state (operation 900). In this illustrative example, the new agent state is the information that can be obtained from the "args" object. The "args" object can include many states that can be used for different workers.

In this example, the new agent state comprises the updated weights and parameters of the neural networks currently in the training agent. The variations and changes affecting the simulation scenario can be passed into the worker agent using the args object. The args object can contain a path to a parameter file. This file contains the range of admissible simulation parameters. At runtime, upon simulation reset, the simulator sample specific values from the parameter ranges in the parameter file.

The process updates the worker agent with the new agent state (operation 902). The worker agent also can have a handle to a simulator object, buffer object, agent optimizer, and other components information for use with the worker agent determined gradients.

A determination is made as to whether J simulator states have been taken (operation 904). In this example, each step is a time step in the simulation. If J similar steps have not been taken, the process resets the simulator if done (operation 906). In operation 906, the simulator can be reset to run again if the simulation has ended or otherwise completed.

The process gets worker agent action and state value estimate given current observations from the simulator (operation 908). In operation 908, the observations and action masks are passed as inputs to the actor neural network and critic neural network in the worker agent. This input results in an action output from the actor network and a value output from the critic network.

The process advances the simulator a selected number of frames and receives the next state simulator outputs (operation 910). In this example, the simulator outputs can be observations, awards, and other information regarding the simulation. In this example, a step can encompass multiple frames in the simulation. A frame is a snapshot of the simulation state taken at the smallest change in time allowable by the simulator.

The process stores the outputs from the simulator and the worker agent in the buffer (operation 912). In step 912, the worker agent outputs actions and value estimates. The simulator outputs from the simulator include observations, rewards, and other information. This information can be used to create action masks and platform masks. In this example, the buffer can be, for example, buffer 336 in FIG. 3.

The buffer is a storage used to store the history gathered from running the simulator and executing the worker agent at each simulator step. The buffer stores a running history of the worker agent observations, action masks, fighters alive masks, simulator done flag, simulator reward for taking a particular action, value prediction calculated by the critic neural network in the worker agent. The buffer also stores the advantage and value-targets calculated by the General Advantage Estimation (GAE) function.

The buffer can also be used to sample batches of data during the 'worker' update loop, where the update loop calculates and applies internal weight changes, i.e., gradients, to the worker agent. In this example, the state of the simulator is the true or actual status of the entities and relations in the simulator. Observations are the perceived state of the environment by each platform or team of platforms. Observations can be noisy, delayed, or missing some information.

The process then returns to operation 904 to determine whether J similar steps have been taken.

In operation 904, if J simulator steps have been taken, the process calculates a generalized Advantage Estimation (GAE) to assess quality of actions taken in observed states, receive advantage and agent value_targets and adds to buffer (operation 914). In operation 914, the state is the state of the simulator. The state includes observations for vehicles, rewards, information about vehicles and objects. This information can be used to create action masks and valid platform masks.

In this illustrative example, General Advantage Estimation (GAE) is a commonly used function within reinforcement learning to determine the quality of actions taken in a particular simulator state. Further, value_targets are target values that should be predicted by the critic neural network in the worker agent. The 'value targets' are closer to the true value of the associated simulator state.

Further in operation 914, "advantage" is a calculated value within reinforcement learning. Advantage defines the benefit of taking a particular action in a particular state over the average benefit of being in that state for the simulator.

The process creates a copy of the of the worker agent before updates as an initial agent (operation 916). A determination is made as to whether F worker agent updates have occurred (operation 918).

If F worker agent updates have not occurred, the process gets a batch of data from the buffer (operation 920). In step 920, the buffer contains multiple simulation steps worth of data. For example, the buffer may contain 400 steps of data. A batch of data from the buffer might only be 32 steps worth of data sampled from the buffer by some sampling method such as by random, chunks of sequential time, or other types of sampling.

The process calculates an entropy loss, a value network loss, and actor network loss, sums the losses, and stores the sum as a total loss value (operation 922). In operation 922, entropy loss can be determined using different loss calculations.

For example, a Shannon entropy calculation can be used for entropy loss and incentivizes action probability distributions with more certainty in a particular action versus a more spread probability distribution over actions. The value network loss can be determined as the squared error difference between the value network value output and the value target calculated by the General Advantage Estimation function. The actor loss uses a proximal policy optimization (PPO) clipped objective function. This function incentivizes quality actions and disincentives poorly rewarded actions. This function can be clipped and bounded such that the action predicted by the actor neural network in the current time step does not deviate substantially from the action predicted by a slightly older version of the actor neural network.

The process uses a backpropagation algorithm and the total loss value to calculate gradients for changes to weights in the worker agent (operation 924). These gradients can be applied to both neural networks, the factor neural network and the critic neural network, in the agent.

In this example, the gradients reflecting the changes in the weights take the form of matrices of floating point values describing the changes (i.e., deltas) to the internal weights of the neural networks. As described in operation 924, gradients are calculated by applying a backpropagation algorithm that uses the loss/cost function of the actor neural network and critic neural network to calculate the gradients, or updates, to the neural network weights.

The process clips the gradients using Min and Max boundaries and applies the clip gradients to the worker agent (operation 926). The process calculates total gradients as differences between the updated weights in the worker agent and the initial weights in the initial worker agent (operation 928). The process returns to operation 918.

Reference again to step 918, if F worker agent updates have occurred, the process outputs the total gradients (operation 930). The process terminates thereafter. The total gradients output by this process are used in operation 814 in FIG. 8 in which the process gathers all the gradients from the different worker agents.

Figure 10:
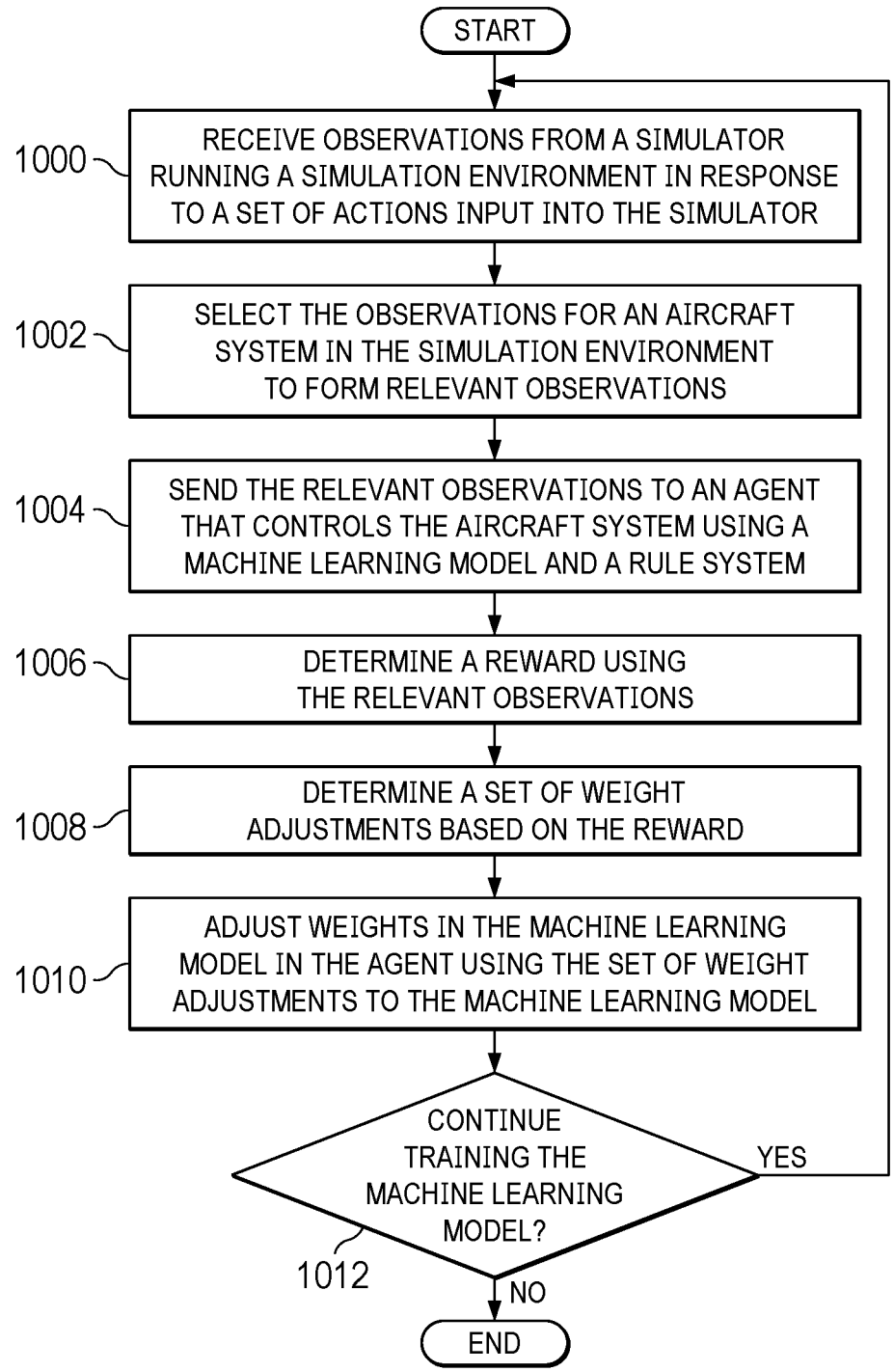
FIG. 10 is an illustration of a flowchart of a process for training a machine learning model in accordance with an illustrative embodiment.

Turning next to FIG. 10, an illustration of a flowchart of a process for training a machine learning model is depicted in accordance with an illustrative embodiment. The process in FIG. 10 can be implemented in hardware, software, or both. When implemented in software, the process can take the form of program instructions that are run by one of more processor units located in one or more hardware devices in one or more computer systems. For example, the process can be implemented in behavior controller 214 in computer system 212 in FIG. 2.

The process begins by receiving observations from a simulator running a simulation environment in response to a set of actions input into the simulator (operation 1000). The process selects observations for an aircraft system in the simulation environment to form relevant observations (operation 1002).

The process sends the relevant observations to an agent that controls the aircraft system using a machine learning model and a rule system (operation 1004). In operation 1004, the machine learning model is configured to receive the relevant observations for the aircraft system and select a maneuver behavior for the aircraft system in response to receiving relevant observations. The rule system is configured to select the set of maneuver actions to execute the maneuver behavior for the aircraft system selected by machine learning model.

The process determines a reward using the relevant observations (operation 1006). In this example, the reward is received in response to the current state of the simulator and actions taken in response to observations in the current state of the simulator.

The process determines a set of weight adjustments based on the reward (operation 1008). Other information can also be used in operation 1008 to determine the set of weight adjustments. For example, information such as observations and actions can also be used. This information can be used to determine losses such as entropy loss, a value network loss, and actor network loss. These losses can be summed and stored for use in determining weight adjustments, such as gradient values.

In operation 1008, model gradients can be used to determine the set of weight adjustments. In this example, model gradients are a mechanism used to adjust weights in the layers of the machine learning model in the form of a neural network. The model gradients are partial derivatives of a loss function with respect to weights in the machine learning model. In this example, the machine learning model is a neural network with a goal to reduce or minimize the loss function through adjusting the weights in the neural network. These model gradients provide information weights should be adjusted to reduce the loss.

The process adjusts weights in the machine learning model in the agent using the set of weight adjustments to the machine learning model (operation 1010). A determination is made as to whether to continue training the machine learning model (operation 1012).

If the training is to continue, the process returns to operation 1000. Otherwise, the process terminates. Although this process has been described with respect to training aircraft systems, the process can be applied to training other vehicle systems other than aircraft.

Figure 11:
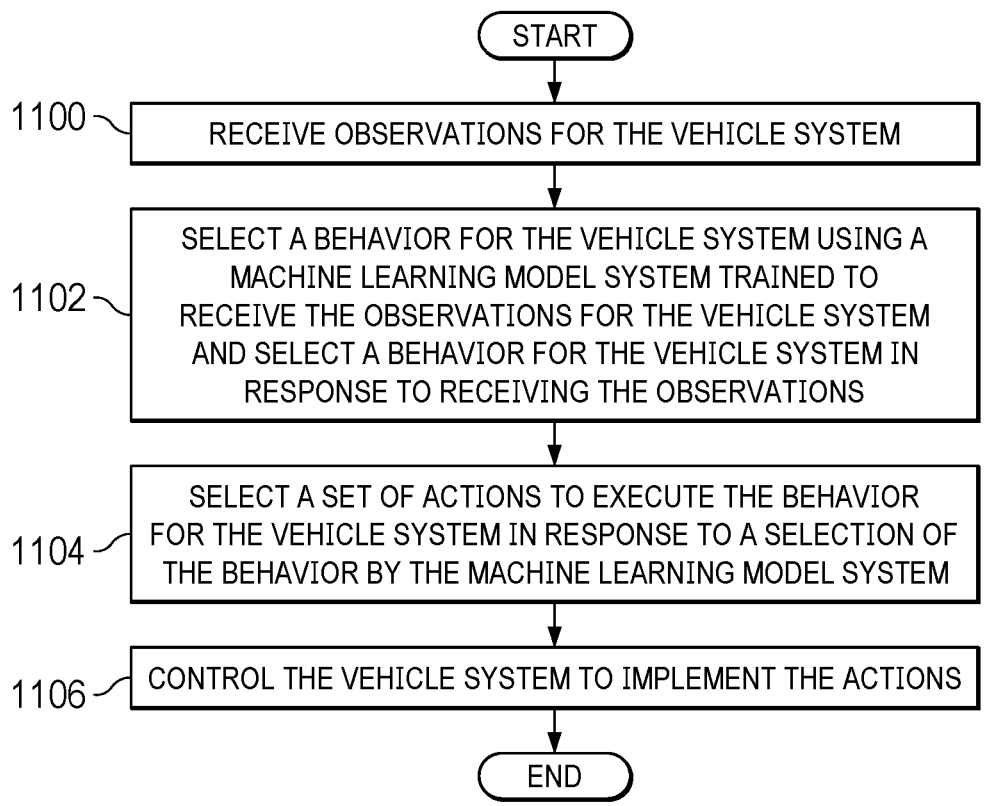
FIG. 11 is an illustration of a flowchart of a process for controlling a vehicle system in accordance with an illustrative embodiment.

With reference to FIG. 11, an illustration of a flowchart of a process for controlling and vehicle system is depicted in accordance with an illustrative embodiment. The process in FIG. 11 can be implemented in hardware, software, or both. When implemented in software, the process can take the form of program instructions that are run by one of more processor units located in one or more hardware devices in one or more computer systems. For example, the process can be implemented in behavior controller 214 in computer system 212 in FIG. 2.

The process begins by receiving observations for the vehicle system (operation 1100). The process selects a behavior for the vehicle system using a machine learning model system trained to receive the observations for the vehicle system and select a behavior for the vehicle system in response to receiving the observations (operation 1102). The process selects a set of actions to execute the behavior for the vehicle system in response to a selection of the behavior by the machine learning model system (operation 1104).

The process controls the vehicle system to implement the actions (operation 1106). The process terminates thereafter.

Figure 12:
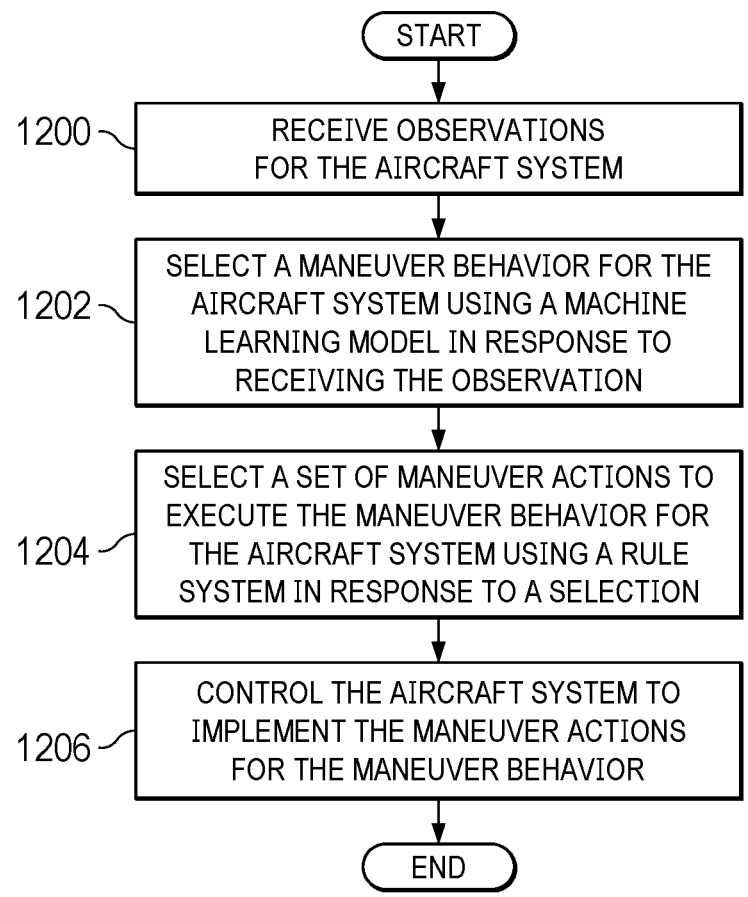
FIG. 12 is an illustration of a flowchart of a process for controlling a vehicle system in accordance with an illustrative embodiment.

Turning to FIG. 12, an illustration of a flowchart of a process for controlling and vehicle system is depicted in accordance with an illustrative embodiment. The process in FIG. 12 can be implemented in hardware, software, or both. When implemented in software, the process can take the form of program instructions that are run by one of more processor units located in one or more hardware devices in one or more computer systems. For example, the process can be implemented in behavior controller 214 in computer system 212 in FIG. 2.

The process begins by receiving observations for the aircraft system (operation 1200). The process selects a maneuver behavior for the aircraft system using a machine learning model in response to receiving the observation (operation 1202). The process selects a set of maneuver actions to execute the maneuver behavior for the aircraft system using a rule system in response to a selection (operation 1204).

The process controls the aircraft system to implement the maneuver actions for the maneuver behavior (operation 1206). The process terminates thereafter.

Figure 13:
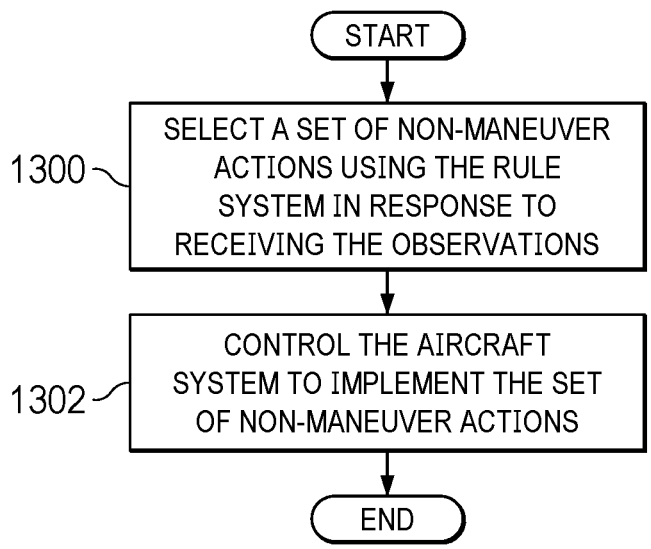
FIG. 13 is an illustration of a flowchart of a process for controlling an aircraft system in accordance with an illustrative embodiment.

With reference next to FIG. 13, an illustration of a flowchart of a process for controlling an aircraft system is depicted in accordance with an illustrative embodiment. This process is an example of additional steps that can be formed with the steps the flowchart in FIG. 12.

The process selects a set of non-maneuver actions using the rule system in response to receiving the observations (operation 1300). The process controls the aircraft system to implement the set of non-maneuver actions (operation 1302). The process terminates thereafter.

Figure 14:
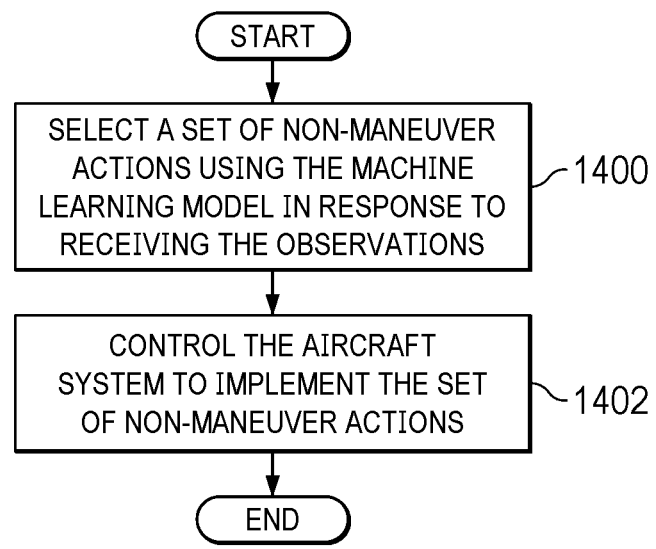
FIG. 14 is an illustration of a flowchart of a process for controlling an aircraft system in accordance with an illustrative embodiment.

In FIG. 14, an illustration of a flowchart of a process for controlling an aircraft system is depicted in accordance with an illustrative embodiment. This process is an example of additional steps that can be formed with the steps the flowchart in FIG. 12.

The process selects a set of non-maneuver actions using the machine learning model in response to receiving the observations (operation 1400). The process controls the aircraft system to implement the set of non-maneuver actions (operation 1402). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 15:
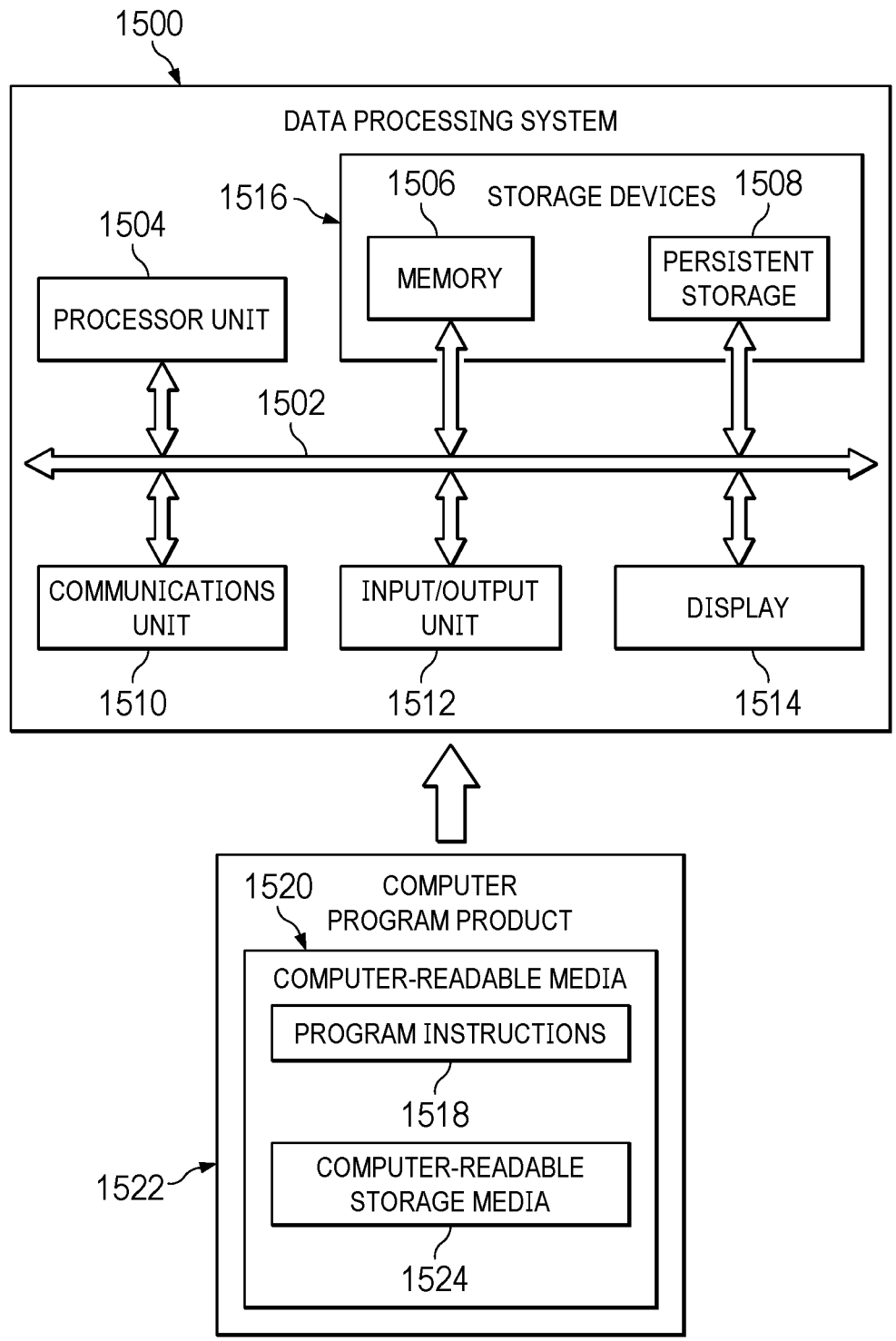
FIG. 15 is an illustration of a block diagram of a data processing system in accordance with an illustrative embodiment.

Turning now to FIG. 15, a block diagram of a data processing system is depicted in accordance with an illustrative embodiment. Data processing system 1500 can be used to implement server computer 104, server computer 106, client devices 110, in FIG. 1. Data processing system 1500 can also be used to implement computer system 212 in FIG. 2. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may also be referred to as computer readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer readable program instructions that can be read and executed by a processor in processor unit 1504. The program instructions in the different embodiments can be embodied on different physical or computer readable storage media, such as memory 1506 or persistent storage 1508.

Program instructions 1518 are located in a functional form on computer readable media 1520 that is selectively removable and can be loaded onto or transferred to data processing system 1500 for execution by processor unit 1504. Program instructions 1518 and computer readable media 1520 form computer program product 1522 in these illustrative examples. In the illustrative example, computer readable media 1520 is computer readable storage media 1524.

Computer readable storage media 1524 is a physical or tangible storage device used to store program instructions 1518 rather than a medium that propagates or transmits program instructions 1518. Computer readable storage media 1524 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 1524, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1518 can be transferred to data processing system 1500 using a computer readable signal media. The computer readable signal media are signals and can be, for example, a propagated data signal containing program instructions 1518. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1520" can be singular or plural. For example, program instructions 1518 can be located in computer readable media 1520 in the form of a single storage device or system. In another example, program instructions 1518 can be located in computer readable media 1520 that is distributed in multiple data processing systems. In other words, some instructions in program instructions 1518 can be located in one data processing system while other instructions in program instructions 1518 can be located in one data processing system. For example, a portion of program instructions 1518 can be located in computer readable media 1520 in a server computer while another portion of program instructions 1518 can be located in computer readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, the illustrative examples provide a method, apparatus, system, and computer program product for controlling the behavior of a vehicle system. The vehicle system can include one or more vehicles. In one illustrative example, a vehicle management system comprising a computer system and an agent. The agent comprises a machine learning model and a rule system. The machine learning model system is trained to receive observations for the vehicle system and select a behavior for the vehicle system in response to receiving the observations. The rule system is configured to select a set of actions to execute the behavior for the vehicle system in response to a selection of the behavior by the machine learning model system.

In the illustrative examples, the vehicle management system employs a hierarchical system that includes a machine learning model system and a rules system in an agent. In this example, the machine learning model system can select behaviors and rule system select and perform actions to implement the behaviors. Further, the rule system can select actions to implement behaviors that are not selected by the machine learning model system. In yet other illustrative examples, the machine learning model system can select behaviors and actions for the behaviors depending on the particular implementation.

In the different illustrative examples, the vehicle management system can control the behavior of one or multiple vehicles. When multiple vehicles are present, the control can be synchronized behaviors in which a single behavior is performed for multiple vehicles. In another illustrative example, individual behaviors can be selected and implemented for each of the vehicles. In some illustrative examples, action masks can be used to mask or avoid the selection as valid actions by the machine learning model system.

The control of vehicles in a vehicle system can be performed for a vehicle system in the simulation or physical vehicles in the real world. In illustrative example, the controller can be used to translate or create instructions that are used to control the vehicle system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft management system comprising:
    a computer system; and
    an agent comprising:
    a machine learning model system configured to:
    receive observations for an aircraft system; and
    select a maneuver behavior for an aircraft system in response to receiving the observation; and
    a rule system configured to:
    select a set of maneuver actions to execute the maneuver behavior for the aircraft system in response to a selection of the maneuver behavior the by machine learning model system.

2. The aircraft management system of claim 1, wherein the rule system is further configured to:
    select a set of non-maneuver actions in response to receiving the observations.

3. The aircraft management system of claim 2, wherein the set of non-maneuver actions is selected from at least one of a weapon guidance, a weapon select, and a weapon firing.

4. The aircraft management system of claim 1 further comprising:
    a controller for the aircraft system, wherein the agent sends the maneuver actions to controller and wherein the controller creates instructions from the maneuver actions and sends the instructions to the aircraft system.

5. The aircraft management system of claim 4, wherein the instructions control a behavior of an aircraft in the aircraft system individually.

6. The aircraft management system of claim 4, wherein the instructions control a behavior of aircraft in the aircraft system in a coordinated manner.

7. The aircraft management system of claim 1, wherein the machine learning model system selects the maneuver behavior using an action mask that avoids selection of an invalid maneuver behavior.

8. The aircraft management system of claim 1 further comprising:
    a sensor system configured to generate sensor data for the observations.

9. The aircraft management system of claim 1, wherein the machine learning model system is trained to select a behavior selected from a group comprising the maneuver behavior and a non-maneuver action in response to receiving the observations for the aircraft system.

10. The aircraft management system of claim 1, wherein the maneuver behavior is selected from a group comprising a route vectoring, a route formation, an ingress vectoring, an ingress formation, an intercept, a missile intercept, a pure pursuit, a vectoring, a crank, a grinder, a pump, an egress, a vector relative to a primary enemy aircraft, an aircraft vector relative to a primary enemy aircraft centroid, and a missile vector relative to a primary enemy missile centroid.

11. The aircraft management system of claim 1 wherein the aircraft system is selected from a group comprising one of a single aircraft, a plurality of aircraft, and the plurality of aircraft on a team.

12. The aircraft management system of claim 1, wherein the aircraft system is selected from at least one of an aircraft in a simulation or a physical aircraft.

13. The aircraft management system of claim 1, wherein the set of machine learning models is selected from a group comprising a neural network, a reinforcement learning neural network, a multi-layer perceptron, a reinforcement learning machine learning model, and a proximal policy optimization machine learning model.

14. An agent management system comprising:
    a computer system;
    a simulator in the computer system configured to run a simulation environment; receive actions for the simulation environment; input the actions into the simulation environment; and output observations from the simulation environment; and an agent comprising:
  a machine learning model configured to receive relevant observations for an aircraft system and select a maneuver behavior for the aircraft system in response to receiving the relevant observations;
  a rule system configured to select a set of actions to execute the maneuver behavior for the aircraft system selected by machine learning model;
  an agent environment interface in the computer system, wherein the agent environment interface is configured to send actions selected by the agent to the simulator; receive observations from the simulator in response to the actions sent to the simulator; select the observations for the aircraft system to form the relevant observations; send the relevant observations to the agent; and determine a reward from using the observations from the simulation; and
  an agent optimizer in the computer system, wherein the agent optimizer is configured receive the reward from the agent environment interface in response to the set of actions sent the simulator; determine a set of weight adjustments based on the reward; and send set of weight adjustments to the machine learning model.

15. The agent management system of claim 14, wherein the machine learning model is selected from a group comprising a neural network, a reinforcement learning neural network, a multi-layer perceptron, a reinforcement learning machine learning model, and a proximal policy optimization machine learning model.

16. A vehicle management system comprising:
  a computer system; and
  an agent comprising:
    a machine learning model system trained to receive observations for the vehicle system and select a behavior for the vehicle system in response to receiving the observations; and
    a rule system configured to select a set of actions to execute the behavior for the vehicle system in response to a selection of the behavior by the machine learning model system.

17. The vehicle management system of claim 16, wherein the rule system is configured to select a selected action in response to receiving the observations, wherein the selected action is for a different behavior type from a behavior type for the behavior selected by the machine learning model system.

18. The vehicle management system of claim 17, wherein the selected action is selected from a group comprising selecting a weapon, targeting an object, firing the weapon, and capturing an image.

19. The vehicle management system of claim 16, wherein the agent controls one of a single vehicle, a plurality of vehicles, and a plurality of vehicles on a team.

20. The vehicle management system of claim 16, wherein the behavior is a maneuver behavior and is selected from a group comprising a route vectoring, a route formation, an ingress vectoring, an ingress formation, an intercept, a missile intercept, a pure pursuit, a vectoring, a crank, a grinder, a pump, an egress, a vector relative to a primary enemy aircraft, an aircraft vector relative to a primary enemy aircraft centroid, and a missile vector relative to a primary enemy missile centroid.

21. The vehicle management system of claim 16, wherein the machine learning model system is a set of machine learning models that are selected from at least one of a neural network, a reinforcement learning neural network, a multi-layer perceptron, a reinforcement learning machine learning model, or a proximal policy optimization machine learning model.

22. The vehicle management system of claim 16, wherein vehicle system is selected from at least one of a vehicle in a simulation or a physical vehicle.

23. The vehicle management system of claim 16, wherein the vehicle system is selected at least one of a mobile platform, an aircraft, a fighter, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a spacecraft, or and an automobile.

24. A method for controlling a vehicle system, the method comprising:
  receiving, by a computer system, observations for the vehicle system;
  selecting, by the computer system, a behavior for the vehicle system using a machine learning model system trained to receive the observations for the vehicle system and select a behavior for the vehicle system in response to receiving the observations;
  selecting, by the computer system, a set of actions to execute the behavior for the vehicle system in response to a selection of the behavior by the machine learning model system; and
  controlling, by the computer system, the vehicle system to implement the actions.

25. A method for controlling an aircraft system, the method comprising:
  receiving, by a computer system, observations for the aircraft system;
  selecting, by the computer system, a maneuver behavior for the aircraft system using a machine learning model in response to receiving the observation;
  selecting, by the computer system, a set of maneuver actions to execute the maneuver behavior for the aircraft system using a rule system in response to a selection; and
  controlling, by the computer system, the aircraft system to implement the maneuver actions for the maneuver behavior.

26. The method of claim 25 further comprising:
  selecting, by the computer system, a set of non-maneuver actions using the rule system in response to receiving the observations; and
  controlling, by the computer system, the aircraft system to implement the set of non-maneuver actions.

27. The method of claim 25 further comprising:
  selecting, by the computer system, a set of non-maneuver actions using the machine learning model in response to receiving the observations; and
  controlling, by the computer system, the aircraft system to implement the set of non-maneuver actions.

28. A method for training a machine learning model, the method comprising:
  receiving, by a computer system, observations from a simulator running a simulation environment in response to a set of actions input into the simulator;
  selecting, by the computer system, the observations for an aircraft system in the simulation environment to form relevant observations;
  sending, by the computer system, the relevant observations to an agent that controls the aircraft system, wherein the agent comprises a machine learning model configured to receive the relevant observations for the aircraft system and select a maneuver behavior for the aircraft system in response to receiving relevant observations; and a rule system configured to select the set of actions to execute the maneuver behavior for the aircraft system selected by machine learning model;

determining, by the computer system, a reward using the relevant observations;

determining, by the computer system, a set of weight adjustments based on the reward; and adjusting, by the computer system, weights in the machine learning model in the agent using the set of weight adjustments to the machine learning model.

29. A method for training a machine learning model, the method comprising:

creating, by a computer system, an artificial intelligence agent comprising an actor neural network, a critic neural network, and an optimizer;

creating, by the computer system, worker agents, wherein a worker agent comprises neural network;

running, by the computer system, the worker agent with simulations using a set of arguments that are different from a set of arguments for another neural network;

generating, by the computer system, gradients to update weights in the worker agents using results of the simulations;

determining, by the computer system, total gradients using the gradients generated for the worker agents; and updating, by the computer system, the actor neural network using the total gradients.

* * * * *